(12) United States Patent
Levy et al.

(10) Patent No.: US 10,719,983 B2
(45) Date of Patent: Jul. 21, 2020

(54) THREE DIMENSIONAL MAP GENERATION BASED ON CROWDSOURCED POSITIONING READINGS

(71) Applicant: ANAGOG LTD., Ramot Meir (IL)

(72) Inventors: Gil Levy, Ramot Meir (IL); Yaron Aizenbud, Haifa (IL)

(73) Assignee: ANAGOG LTD., Tel Aviv (IL)

( * ) Notice: Subject to any disclaimer, the term of this patent is extended or adjusted under 35 U.S.C. 154(b) by 0 days.

(21) Appl. No.: 16/151,782

(22) PCT Filed: Apr. 6, 2017

(86) PCT No.: PCT/IL2017/050418
§ 371 (c)(1),
(2) Date: Oct. 4, 2018

(87) PCT Pub. No.: WO2017/175227
PCT Pub. Date: Oct. 12, 2017

(65) Prior Publication Data
US 2020/0027265 A1    Jan. 23, 2020

Related U.S. Application Data

(60) Provisional application No. 62/319,100, filed on Apr. 6, 2016.

(51) Int. Cl.
*G06T 17/05* (2011.01)
*H04W 4/38* (2018.01)
(Continued)

(52) U.S. Cl.
CPC ............ *G06T 17/05* (2013.01); *G01C 5/06* (2013.01); *G01S 5/0252* (2013.01); *G01S 19/48* (2013.01); *G06T 11/206* (2013.01); *G10L 25/51* (2013.01); *H04W 4/029* (2018.02); *H04W 4/33* (2018.02); *H04W 4/38* (2018.02); *H04W 84/12* (2013.01)

(58) Field of Classification Search
CPC ....... G06T 17/05; G06T 11/206; G06T 17/00; H04W 4/38; H04W 4/33; H04W 4/029;
(Continued)

(56) References Cited

U.S. PATENT DOCUMENTS 9,980,246 B2 * 5/2018 Pattabiraman ...... H04W 52/283
2007/0093962 A1 * 4/2007 Swope ..................... G01C 5/06
701/507

(Continued)

*Primary Examiner* — Xilin Guo
(74) *Attorney, Agent, or Firm* — Lawrence N. Ginsberg

(57) ABSTRACT

A method, product and system for three dimensional map generation based on crowdsourced positioning readings. The method comprising obtaining a plurality of positioning readings of a plurality of mobile devices. Each reading of the plurality of positioning readings is indicative of an altitude, latitude and longitude of a mobile device, and is determined using one or more sensors of the mobile device. The method comprises clustering the plurality of positioning readings to determine clusters of positioning readings. for each cluster, an altitude value is computed, based on an altitude of each positioning reading in the cluster, whereby determining an estimated altitude based on non-accurate altitude readings. The three-dimensional map is generated based on the plurality of positioning readings and the altitude value of each cluster.

46 Claims, 9 Drawing Sheets

(51) Int. Cl.
*H04W 4/33* (2018.01)
*H04W 4/029* (2018.01)
*G01C 5/06* (2006.01)
*G01S 5/02* (2010.01)
*G01S 19/48* (2010.01)
*G06T 11/20* (2006.01)
*G10L 25/51* (2013.01)
*H04W 84/12* (2009.01)

(58) Field of Classification Search
CPC ........ H04W 84/12; H04W 4/025; G01C 5/06; G01C 5/0252; G01S 19/48; G01S 13/06; G10L 25/51; H04L 67/18; G06K 9/6262; G06K 9/00228; G06F 3/0317
See application file for complete search history.

(56) References Cited

U.S. PATENT DOCUMENTS

| | | | | |
|---|---|---|---|---|
| 2009/0025469 A1* | 1/2009 | Wang | ............ | F02D 41/18 |
| | | | | 73/114.37 |
| 2011/0250903 A1* | 10/2011 | Huang | ............ | G01S 5/0263 |
| | | | | 455/456.1 |
| 2012/0209658 A1* | 8/2012 | Shibayama | ............ | G06Q 10/10 |
| | | | | 705/7.29 |
| 2013/0289999 A1* | 10/2013 | Hymel | ............ | G10L 17/005 |
| | | | | 704/273 |
| 2014/0009366 A1* | 1/2014 | Chang | ............ | G09G 3/2092 |
| | | | | 345/1.1 |
| 2015/0094089 A1* | 4/2015 | Moeglein | ............ | G01S 5/16 |
| | | | | 455/456.1 |
| 2017/0052028 A1* | 2/2017 | Choudhury | ............ | G01C 21/30 |
| 2018/0038695 A1* | 2/2018 | Bitra | ............ | G08G 5/0069 |
| 2018/0206165 A1* | 7/2018 | Hao | ............ | H04W 36/08 |

* cited by examiner

US 10,719,983 B2

THREE DIMENSIONAL MAP GENERATION BASED ON CROWDSOURCED POSITIONING READINGS

CROSS-REFERENCE TO RELATED APPLICATION

This application claims the benefit of U.S. Provisional Application No. 62/319,100 filed Apr. 6, 2016, which is hereby incorporated by reference in its entirety without giving rise to disownment.

TECHNICAL FIELD

The present disclosure relates to three-dimensional map generation in general, and to generation of three-dimensional maps based on crowdsourced positioning readings, in particular.

BACKGROUND

In mapping, planning and various services, it is highly desirable to know how the world looks like in three dimensions, such as land topography, man-made buildings, bridges, roads and any representation of the world that contains three dimensional objects.

The third dimension is a growing topic at mapping technologies, such as GOOGLE™ Street, OpenStreetMap™ (OSM), or the like. The three dimensional mapping allows to add detailed buildings and other minor objects to existing maps.

Is some cases, three-dimensional mapping may require additional information about three-dimensional objects in order to get a realistic representation of the object in three dimensions, such as perpendicular distribution of the object, population within different altitude of the object, different properties of the object in different heights, or the like.

Furthermore, in some cases, the three-dimensional mapping may change over time. As an example, cross-roads may be built and changed over time, new floor may be added to existing buildings, or the like. It may be desirable to be able to update the map as soon as such modifications are exhibited in the world, so as to maintain an accurate representation of the three-dimensional world.

BRIEF SUMMARY

One exemplary embodiment of the disclosed subject matter is a method for generating a three-dimensional map, the method comprising: obtaining a plurality of positioning readings of a plurality of mobile devices, wherein each reading of the plurality of positioning readings is indicative of an altitude, latitude and longitude of a mobile device, wherein the each reading is determined using one or more sensors of the mobile device; clustering the plurality of positioning readings to determine clusters of positioning readings; for each cluster, computing an altitude value, based on an altitude of each positioning reading in the cluster, whereby determining an estimated altitude based on non-accurate altitude readings; and generating the three-dimensional map, wherein said generating is based on the plurality of positioning readings and the altitude value of each cluster.

Optionally, the plurality of positioning readings comprises a first positioning reading and a second positioning reading, wherein the first positioning reading comprises an absolute altitude and a relative altitude, wherein the second positioning reading comprises a relative altitude.

Optionally, the method further comprising: correlating between the relative altitude of the first positioning reading and the relative altitude of the second positioning reading; and determining, based on said correlating and based on the absolute altitude of the first positioning reading, an absolute altitude of the second positioning reading.

Optionally, the first positioning reading and the second positioning reading are positioning readings of a same mobile device of the plurality of mobile devices.

Optionally, the relative altitude of the first positioning reading and the relative altitude of the second positioning reading are equal.

Optionally, the relative altitude of the first positioning reading and the relative altitude of the second positioning reading are different.

Optionally, the first positioning reading indicates a location at a first time point, wherein the second positioning reading indicates a location at a second time point, wherein the first time point precedes the second time point.

Optionally, the first positioning reading indicates a location at a first time point, wherein the second positioning reading indicates a location at a second time point, wherein the second time point precedes the first time point, whereby utilizing a reading of a later point in time to determine absolute altitude of a reading at an earlier point in time.

Optionally, the first positioning reading is determined using a Global Positioning System (GPS) sensor, wherein the second positioning reading is determined without using of any GPS sensor.

Optionally, the first positioning reading comprises a first Wi-Fi sensor reading, wherein the second positioning readings comprises a second Wi-Fi sensor reading, wherein the first and the second Wi-Fi sensor readings indicate connection to a same Wi-Fi network, whereby indicating that the first and the second readings are readings in a same proximal location.

Optionally, the first Wi-Fi sensor reading comprises a first signal strength level, s wherein the second Wi-Fi sensor reading comprises a second signal strength level, wherein a level difference between the first and second signal strength levels is below a predetermined threshold.

Optionally, the first positioning reading comprises a first voice recording captured by a microphone, wherein the second positioning reading comprises a second voice recording captured by the microphone or by a second microphone.

Optionally, the method further comprises: determining that the first and the second positioning readings are located within a same area, wherein said determining is performed based comparing the first voice recording and the second voice recording.

Optionally, the first and the second positioning reading are determined using a non-accurate location service, wherein the non-accurate location service provides potential positioning areas having a diameter of at least about 50 meters.

Optionally, the relative altitude of the first reading is a first barometer reading, wherein the relative altitude of the second reading is a second barometer reading, wherein a time difference between the first barometer reading and the second barometer reading is below a threshold.

Optionally, barometer readings sampled in between the first barometer reading and the second barometer reading exclude device-induced atmospheric pressure change.

Optionally, the plurality of positioning readings comprises an absolute altitude reading of a mobile device and a set of accelerometer readings obtained from the mobile device, wherein the set of accelerometer readings succeeds in time the absolute altitude reading; wherein said obtaining comprises: determining, based on the set of accelerometer readings, a change in altitude of the mobile device; and computing, based on the absolute altitude reading and on the change in altitude, an absolute altitude of the mobile device.

Optionally, said determining is performed by a classifier, wherein the classifier is configured to determine the change in the altitude of the mobile device based on one or more accelerometer reading of the set of accelerometer readings, wherein the classifier is trained based on a training set comprising pairs of accelerometer readings and labels thereof obtained using one or more devices, wherein each label of an accelerometer reading in the training set is an altitude change computed based on barometer readings, wherein the barometer reading and the accelerometer reading are obtained by a same device of said one or more devices.

Optionally, the plurality of mobile devices are heterogeneous mobile devices having different sets of sensors.

Optionally, the three-dimensional map is a dynamic map, wherein the dynamic map represents dynamic population distribution in different altitudes of a single location in the dynamic map.

Optionally, the single location is a building, wherein the dynamic map shows a population of each floor of the building.

Another exemplary embodiment of the disclosed subject matter is an apparatus having a processor and memory, wherein said apparatus is connectable over a computer network to a plurality of mobile devices, wherein the processor being adapted to perform a method comprising: obtaining a plurality of positioning readings of the plurality of mobile devices, wherein each reading of the plurality of positioning readings is indicative of an altitude, latitude and longitude of a mobile device, wherein the each reading is determined using one or more sensors of the mobile device; clustering the plurality of positioning readings to determine clusters of positioning readings; for each cluster, computing an altitude value, based on an altitude of each positioning reading in the cluster, whereby determining an estimated altitude based on non-accurate altitude readings; and generating the three-dimensional map, wherein said generating is based on the plurality of positioning readings and the altitude value of each cluster.

Yet another exemplary embodiment of the disclosed subject matter is a computer program product comprising a non-transitory computer readable storage medium retaining program instructions, which program instructions when read by a processor, cause the processor to perform a method comprising: obtaining a plurality of positioning readings of a plurality of mobile devices, wherein each reading of the plurality of positioning readings is indicative of an altitude, latitude and longitude of a mobile device, wherein the each reading is determined using one or more sensors of the mobile device; clustering the plurality of positioning readings to determine clusters of positioning s readings; for each cluster, computing an altitude value, based on an altitude of each positioning reading in the cluster, whereby determining an estimated altitude based on non-accurate altitude readings; and generating the three-dimensional map, wherein said generating is based on the plurality of positioning readings and the altitude value of each cluster.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
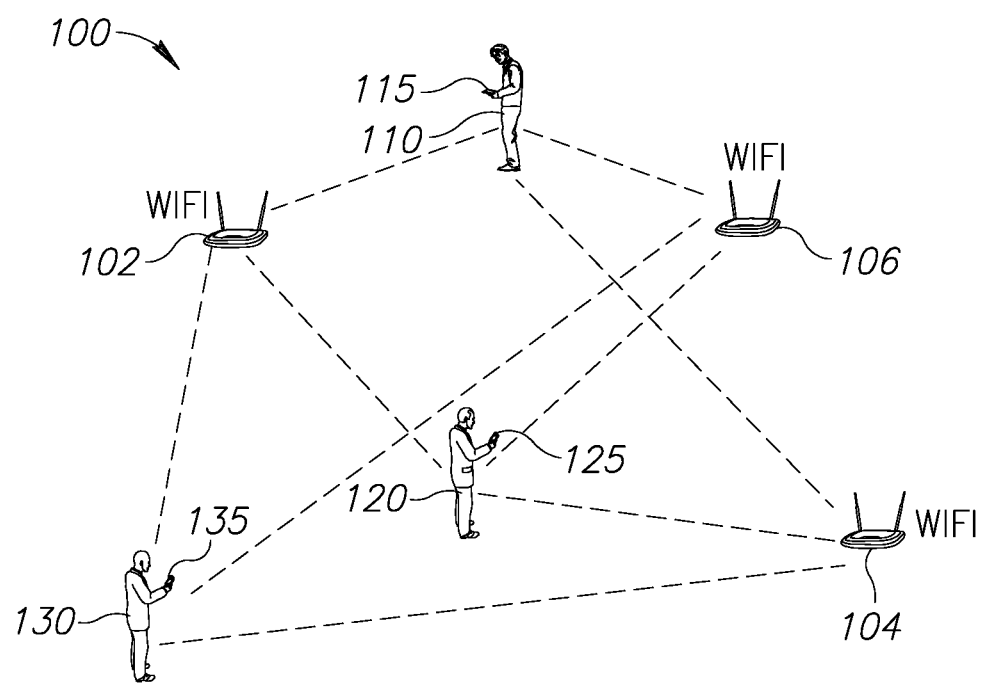
FIG. 1 shows a schematic illustration of an exemplary environment in which the disclosed subject matter is utilized, in accordance with some exemplary embodiments of the disclosed subject matter.

One technical problem dealt with by the disclosed subject matter is to generate three-dimensional maps. Three-dimensional maps may be useful for many different usages, however their creation requires dedicated devices and expensive processes.

In some cases, satellite imagery may be used to identify the topography of the earth, but such inputs are useless in identifying floors within buildings or surfaces that are otherwise blocked from the view of the satellite.

Another technical problem is to use non-accurate altitude readings, such as readings which may have an error of more than about 10 m, to estimate the correct altitude in each surface. In some cases, non-accurate altitude readings may be obtained using dead-reckoning based estimations. Additionally or alternatively, non-accurate altitude readings may be obtained from non-accurate sensors, or from sensors having an error above about 10 m.

Yet another technical problem is to augment a set of readings which include a s first subset of readings with absolute altitude values and a second subset of partial readings which do not include explicit absolute altitude. In some cases, it may be desired to complete the missing absolute altitude value in the subset of partial using information obtained from the set of readings as to indicate the absolute altitude. Sensors such as barometers, accelerometers, microphones, Wi-Fi receivers, or the like, may be available and potentially leveraged for such augmentation.

One technical solution is to generate three-dimensional maps based on crowd-sourced information obtained from mobile devices of users. The mobile devices may include dedicated application, applications incorporating Software Development Kits (SDKs), or other software products that may track and report sensor readings to a server, such as via the Internet. Based on the readings, a three dimensional map may be generated or an existing map may be updated.

By aggregating the height information from many devices, it is possible to create a map of buildings, hills, roads or any other 3D objects. Each device can provide latitude, longitude and altitude reading and a server or servers aggregating such data can create a three dimensional representation of the sampled data.

The readings may be used to compute a static three-dimensional map indicating the locations in which users of mobile devices are capable of traveling, including external surfaces, such as roads and bridges; underground levels, such as tunnels and subways; alternative floors of a same building; or the like. In some cases, the map may be updated once additional readings are obtained indicating a new surface on top of which a mobile device traveled. Surfaces which were not traveled for a predetermined period of time, such as a week, a month, or the like, may be deemed to be removed from the three-dimensional map as they may be obsolete.

The readings may be used to compute a dynamic three-dimensional map indicating population of different surfaces at different times. If the data is received from human beings with mobile devices such as mobile phones, it is possible to learn, visualize and analyze the behavior of the crowd in three dimensions, such as to know how populated is each floor in a building or how many floors are populated as a function of time/day/hour in a day.

Another technical solution may be to cluster data samples to determine altitude of surfaces based on non-accurate readings. In some exemplary embodiments, the accuracy of reading can be used in order to decide how to take this reading into account. Multiple readings of same coordinates or similar coordinates can be used in order to better estimate the real 3D coordinate by using averaging/median or any other formula or algorithm taking into account multiple samples.

In some exemplary embodiments, clusters of the readings may be determined. The clusters may be determined using an unsupervised learning, such as Connectivity-based clustering, k-means clustering, k-means mixture models, hierarchical clustering, or the like. A cluster may represent samples at a similar location. The clusters may be determined so as to aggregate readings from the same surface. For example, one cluster may relate to readings from a first floor, while a second cluster may relate to readings from a second floor of the same building and directly above the first floor. In some cases, a same floor may be divided into several clusters as well. Stairways and elevators may be identified based on vertical clusters created in which the readings indicate varying altitudes of more than about half a floor (e.g., above 5 m). Additionally or alternatively, readings from stairways and from elevators may be identified based on mobility status of the device, such as determined based on the accelerometer readings, and may be filtered out from the clusters to avoid introducing noise relating to the altitudes of the surfaces themselves. An altitude of each cluster may be computed, such as by computing a median altitude, mean altitude, or the like. The altitude may be computed based on the centroid of the cluster.

In some exemplary embodiments, the altitude may be adjusted based on the excepted height above the floor of the average device. For example, a user may ordinarily carry the device in her pocket at about 1 meter above the ground. When the user uses the device, she may pick it by hand and it may be located at about 1.4 meters above the ground, and she may hold it against her ear when speaking, and the device may be located at about 1.6 m. The height above ground may be computed individually to each sampled point, such as using camera inputs and other sensors, taking into account mobility status and accelerometer readings (e.g., indicating whether the device is held by hand or carried), or the like. In some cases, sensor readings may be used to differentiate a user carrying the device in her pocket than a user carrying her device in a purse, thereby allowing to estimate the correct above-ground value for the device at each point. Additionally or alternatively, the height of the user may be used to estimate the height above the ground. The user's height may be obtained from images of the user, using the camera, based on varying values of sensors, such as varying barometer readings over time indicating difference in height between the user's pocket and the user's ear when using a mobile phone, or the like. In some cases, the sampled readings may be adjusted by reducing the computed or estimated above-ground value of each such sample. The altitude may be adjusted prior to the clustering process. Additionally or alternatively, an average, median or the like, may be computed for the cluster and such value may be used to adjust the altitude computed based on the cluster.

Yet another technical solution is to augment partial readings using other readings. Sensor fusion may be employed for the augmentation of the partial readings. The other readings may be obtained from a same device as the partial reading being augmented, or using a different device. In some cases, the partial reading may be obtained after a full reading is obtained, and the partial reading may be completed using the previous reading together. Additionally or alternatively, the partial reading may be obtained prior to obtaining the complete reading, and used to "go back" and complete missing values in previously obtained partial readings. In some exemplary embodiments, a device which discovers its current absolute altitude, such as when first having a line of sight (LOS) with the GPS satellites, may compute the altitudes in previous explored locations based on the estimated height differences between the current location and the previous locations. The estimated height differences may be computed using accelerometer readings indicative of change in altitude and change rate thereof, based on barometer readings, or the like. In some exemplary embodiments, it may be estimated that the device is in the same altitude as before, such as when the device senses similar external signals as were sensed in the previous locations. In some exemplary embodiments, similar computation may be performed for different devices that are co-located at the same location at the same time, or at different times.

The partial reading may be a reading which does not comprise any absolute altitude value. The partial reading may comprise a relative altitude reading, which may indicate the altitude indirectly. Relative altitude reading may be a reading which indicates s indirectly the altitude, such as based on a corresponding baseline. Given the absolute altitude of the baseline, the relative altitude may be used to compute or estimate the absolute altitude for the partial reading. As an example, a relative altitude reading may be a barometer reading. Two barometer readings may be compared to one another. The barometer readings may be readings that were sampled at relatively similar times, such as within a timeframe of one minute, about two minutes, about ten minutes, about half an hour, about an hour, or the like. Additionally or alternatively, the relative altitude reading may be an accelerometer readings indicative of a change in altitude over time. Additionally or alternatively, the relative altitude reading may be a reading which indicates that the device is located in a same surface as another device. For example, microphone signals or Wi-Fi signals may be used to determine that two devices are co-located at the same location. If the absolute altitude of one device is known (e.g., obtained from a GPS, or computed in accordance with the disclosed subject matter), the absolute altitude of the second device may be deduced to be the same altitude. In some cases, correlating altitude readings from one device to another may comprise adjusting the altitude based on different height-above-ground values of each device.

In some exemplary embodiments, based on Wi-Fi sensor readings, different samples may be indicated as being in a same area, based on both Wi-Fi sensor readings seeing the same Wi-Fi network, a same set of networks, a similar subset of all visible networks, a similar set of networks (e.g., same set with a variation of up to 25%), or the like. In some cases, the signal strengths of each Wi-Fi network may also be determined and used to estimate whether or not the readings were obtained from a same area. In some cases, a signal strength difference below a predetermined threshold may be indicative of the devices being in the same area. In some cases, different floors in a same building may have significantly different visible Wi-Fi networks, in particularly, in building where the ceilings are relatively high and there's a large distance between the floors, as is the case in many office buildings and shopping centers. Additionally or alternatively, even if the same network is visible in different floors, the signal strength may be significantly different in both floors—a strong signal in one and a weak signal in the other. In some cases, a signal from one Wi-Fi network may indicate a 2D circle in a same floor or a 3D sphere of locations where the device may be located. Taking into account the signal strength, the area may be reduced to a 2D annulus (ring) or 3D spherical shell. By conjuncting several different signals the precise location may be determined, assuming the locations of the Wi-Fi hotspots are known. However, even when the location of the Wi-Fi hotspots themselves is unknown, and the location cannot be accurately inferred based on triangulation, a plurality of signals may be used to determine that two devices are in the same or proximal location, even if such location is unknown. Based on such findings, the disclosed subject matter may utilize absolute latitude associated with a first positioning reading to extrapolate the absolute latitude of a second positioning reading, such as by determining they are both at the same altitude.

In some exemplary embodiments, based on audio signals obtained from microphones, it may be determined that two devices are co-located. If two devices pick up the same sound, it may be determined they are located proximately to one another. In some cases, only background noise may be analyzed and foreground, such as speech of nearby people, may be filtered out and not used. In some exemplary embodiments, samples obtained at the same space and time may be correlated to one another, and absolute altitude of one sample, may be used to extrapolate an absolute altitude of the other sample.

Yet another technical solution is to determine relative altitude based on accelerometer readings. In some cases, readings from an accelerometer may be obtained over time and such readings may be provided to a classifier to estimate a mobility state of the user. The mobility state may be climbing stairs, walking up heal, descending in an elevator or the like. In some cases, the accelerometer readings may indicate a speed of ascending or descending. Based on the accelerometer readings, an estimated change in altitude may be computed over time thereby allowing to determine an absolute altitude in-doors and in locations where accurate location services are not available.

In some exemplary embodiments, supervised machine learning may be employed to train the classifier. A training set may be obtained. The training set may include accelerometer readings and corresponding labels. The labels may be obtained based on explicit user input. Additionally or alternatively, the labels may be obtained based on other sensor readings, such as GPS readings. As a result, accelerometer readings may be used by other devices where GPS is unavailable (either permanently or temporarily). Additionally or alternatively, the labels may be obtained based on barometer readings. Barometer readings may indicate a change in altitude over time. As s a result, devices which do not have a barometer readings (either permanently or temporarily) may be able to complete missing altitude information using accelerometer readings.

In some exemplary embodiments, a barometer may measure atmospheric pressure. Atmospheric pressure may change when altitude changes. However, in some cases, atmospheric pressure may change over time and can only be used in a proximate timeframe, such as within about one minute, about ten minutes, about half an hour, about an hour, or the like. In some exemplary embodiments, different timeframes may be used at different locations, based on an expected rate of change in atmospheric pressure, such as may be derived from statistical models representing the locations. In some cases, if two devices have the same measured atmospheric pressure by their two barometers within the timeframe, then absolute altitude of one device may be used to determine the absolute altitude of another device is the same. Additionally or alternatively, different atmospheric pressures measured at the same time and in a proximal location, such as within the same building, within a same block, within an area of radius of 500 m, or the like, the relative difference in atmospheric pressure may be used to compute relative altitude change between the two devices and compute an absolute altitude of one device, based on the absolute altitude of the other device. In some cases, two atmospheric pressure readings may be correlated only after ensuring they are obtained within a timeframe (e.g., time difference between the two readings are below a predetermined threshold) and at a same geographical area (e.g., based on non-accurate location services, or based on sensor-based indications that the devices are in the same general location).

In some exemplary embodiments, atmospheric pressure may be tracked over time to ensure changes in the atmospheric pressure are based on altitude change and not on external devices. In some exemplary embodiments, device-induced atmospheric pressure change may occur, such as when an air conditioner is turned on, when an air purifier seizes to work, or the like. Device-induced atmospheric pressure change may be relatively rapid and have a different characteristics than the pressure change caused due to altitude change. By tracking the change of atmospheric pressure over time, it may be possible to distinguish atmospheric pressure changes that are naturally occurring, device-induced atmospheric pressure changes and atmospheric pressure changes caused by change in altitude of a person (e.g., riding an elevator, climbing stair), a car (e.g., climbing s a hill), or the like. If the change in barometer readings is due to a device-induced atmospheric pressure, the readings may be a-priori processed to reduce the impact of the device-induced atmospheric pressure on the readings.

In some cases, altitude readings of devices when located in aircrafts, such as airplanes, air balloons, or the like, may be filtered out from the set of sampling used to generate the three-dimensional map. Such samples may be identified using mobility state of the device, based on accelerometer readings, based on identifying the devices are located in airports and other predetermined points of interest, or the like.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Referring now to FIG. 1 showing a schematic illustration of an exemplary environment in which the disclosed subject matter is utilized, in accordance with some exemplary embodiments of the disclosed subject matter.

Environment 100 comprises Wi-Fi Hotspots 102, 104, 106. Each Wi-Fi Hotspot 102, 104, 106 may allow devices having Wi-Fi receivers to connect to a same or to a different Wi-Fi network. Wi-Fi Hotspots 102, 104, 106 may transmit a signal indicating their existence to nearby devices. The signal may include an identification of the Wi-Fi network, of the Wi-Fi hotspot, or the like. As an example, the signal may include a Service Set Identifier (SSID). User 110 may utilize Device 115. Device 115 may receive signals from Wi-Fi Hotspots 102, 104, 106, and based thereon may determine the proximal location of Device 115. In case the location of Wi-Fi Hotspots 102, 104, 106 is not known, no accurate location may be determined merely based on triangulation. However, based on the differences in the set of visible hotspots and/or signal strengths observed by Device 115 with respect to those observed by Device 125 of User 120, it may be determined that they are not located in proximity to one another. It will be noted that proximity may be defined differently for different applications of the disclosed subject matter, for each application a different maximal distance threshold may be defined to determine whether or not two devices are in proximity to one another. Additionally or alternatively, as a set of visible hotspots observed by Device 135 of User 130 is similar to that of observed by Device 125, it may be determined that they are located in a same area and in proximity to one another. It will be noted that in some cases, the list of visible networks may be different, but sharing a common subset of networks may be sufficient to determine the devices are co-located in the same area. Additionally or alternatively, the strength of the signals of the common subset, which are observed by the devices may be compared and used to determine whether or not the devices are co-located in the same area. In some cases, the signal strength may be normalized as some receivers may function better than others. Normalization may be performed based on a protocol utilized by the different receivers, which may cause a difference in observed signal strength. For example, IEEE 802.11b protocol may be used by one device while IEEE 802.11n protocol may be used by another device, causing a difference in observed signal strengths. The normalization process may adjust the signal strengths to be indifferent of the use of different protocols.

Figure 2:
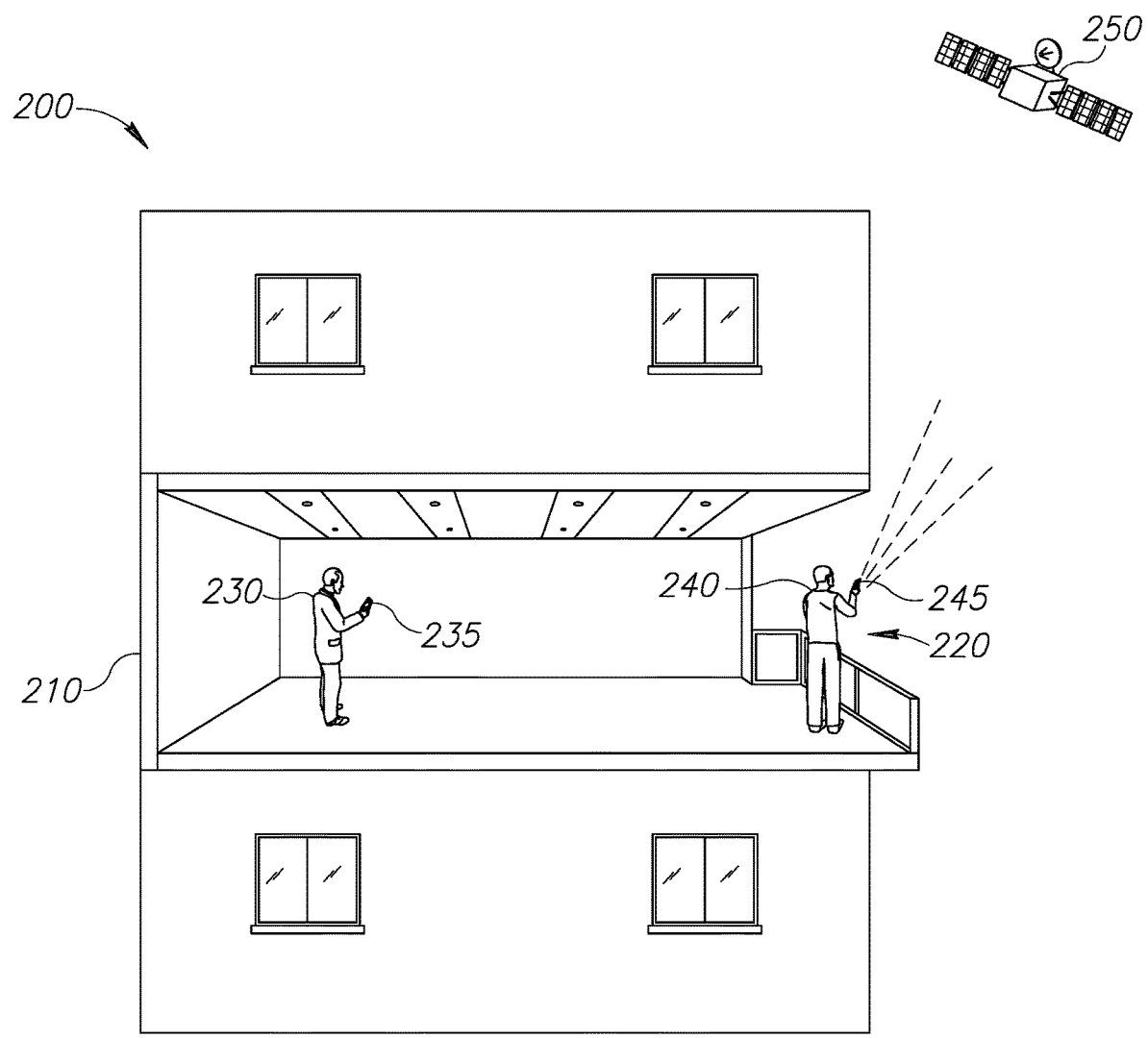
FIG. 2 shows a schematic illustration of an exemplary building in which the disclosed subject matter may be utilized, in accordance with some exemplary embodiments of the disclosed subject matter.

Referring now to FIG. 2 showing a schematic illustration of an exemplary building in which the disclosed subject matter may be utilized, in accordance with some exemplary embodiments of the disclosed subject matter.

Building 200 is a multi-floor building. FIG. 2 shows that Users 230, 240, using Devices 235, 245, respectively, are co-located at a same floor. Device 245 has a LOS to GPS Satellite 250, such as in view of an Opening 220, such as a window, a balcony, a door, or the like, in Building 200. As a result, Device 245 may obtain its accurate position using its GPS receiver, including the altitude at which it is located. Device 235, on the other hand, does not have a LOS to GPS Satellite 250 and cannot determine its accurate altitude using a GPS. Instead, the altitude of Device 235 may be computed based on that of Device 245, if it is known that they are located at the same floor. The disclosed subject matter enables the accurate determination of altitude for Device 235 using the GPS readings obtained by Device 245. The disclosed subject matter is not limited to a pair of devices, and the readings of Device 245 may be used to directly compute absolute altitudes of additional devices. In addition, the readings of Device 245 may be used to indirectly compute absolute altitudes of additional devices, such as by using the derived absolute altitude of Device 235 and using such absolute altitude to derive an absolute altitude for a third device (not shown). It will be noted, that in some cases, the readings of the third device may be correlated with those of Device 235 but not with those of Device 245, such as in view of the sensor readings thereof. As one non-limiting example of such scenario, Device 235 and the third device may pick up similar audio signals indicating they are co-located at the same location, while the audio signals obtained by Device 245 may be different in view of the Opening 220.

In some exemplary embodiments, it may be determined that the two devices are located at the same floor based on Wi-Fi readings. Such determination may be performed even if the two devices were located in the same floor at different times.

In some exemplary embodiments, it may be determined that the two devices are located at the same floor based on audio signals obtained by the respective microphones of the devices. Such determination may require that the two devices be co-located in the same floor at the same time.

In some exemplary embodiments, it may be determined that the two devices are located at the same floor, based on non-accurate location services indicating the general location of Device 235 within Building 200 and based on a relative altitude reading of Device 235. The relative altitude reading may be an atmospheric pressure reading obtained by a barometer. The atmospheric pressure reading may be compared to that obtained by Device 245, to determine their relative altitude difference. Such determination may require that the two devices be co-located in the same floor at a same timeframe (i.e., within less than a predetermined maximal time difference threshold).

Additionally or alternatively, if it is determined that the two devices are located within the same area, such as within the same building, as may be determined using non-accurate location services, if such readings are obtained within less than a maximal time difference threshold from one another (i.e., within a timeframe), the atmospheric pressure readings of Devices 235, 245 may be compared and used to extrapolate the altitude of Device 235 even if such device is located at a different floor than Device 245.

Figure 3:
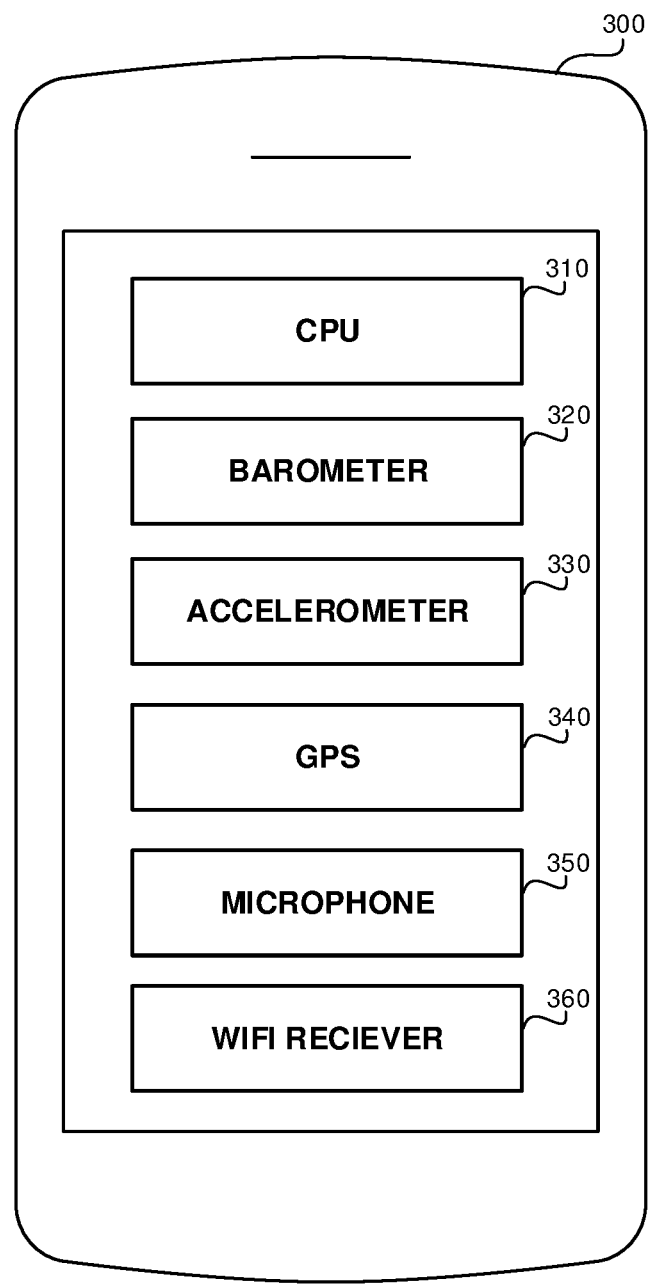
FIG. 3 shows a schematic illustration of a mobile device, in accordance with some exemplary embodiments of the disclosed subject matter.

Referring now to FIG. 3 showing a schematic illustration of a mobile device, in accordance with some exemplary embodiments of the disclosed subject matter.

A Device 300 may be a mobile computing device such as a mobile phone, a handheld computer, a tablet, a Personal Digital Assistance (PDA), or the like. In some exemplary embodiments, Device 300 may comprise an operating system (not shown) capable of running mobile apps, a display screen, a keyboard, a touch screen providing a virtual keyboard and icons, or the like. Device 300 may be connected to the Internet. Additionally or alternatively, Device 300 may interconnect with other devices such as car entertainment systems, speakers, via Wi-Fi, Bluetooth, Near Field Communication (NFC), or the like. In some exemplary embodiments, Device 300 may comprise an integrated camera (not shown), connected to an external camera, or the like, that enables Device 300 to capture photographs, record videos, visually sense images, or the like.

In some exemplary embodiments, Device 300 may comprise a Central Processing Unit (CPU) 310. CPU 310 may be a processor of Device 300, a microprocessor, an electronic circuit, an Integrated Circuit (IC) or the like. CPU 310 may be configured to carry out instructions of programs or apps running on Device 300, by performing basic arithmetic, logical, control and input/output (I/O) operations specified by the instructions. Additionally or alternatively, CPU 310 may be configured to provide the required functionality of Device 300, for example by loading to memory and activating other modules or sensors of Device 300.

In some exemplary embodiments, Device 300 may comprise an atmospheric pressure sensor, such as a Barometer 320 utilized to measure atmospheric pressure around Device 300. Barometer 320 may be configured to sense air pressure based on micro-electro-mechanical systems (MEMS), piezoresistive pressure-sensing technologies, or the like. Using readings obtained from Barometer 320, altitude of Device 300 may be determined. Additionally or alternatively, relative elevation changes of Device 300 may be determined based on Barometer 320 readings. Additionally or alternatively, the readings from Barometer 320 may be utilized for tracking vertical movements of Device 300, or the like. Additionally or alternatively, air pressure readings of Barometer 320 may be utilized by other apps of Device 320 for weather forecasting, or additional uses.

In some exemplary embodiments, Device 300 may comprise an acceleration sensor, such as an Accelerometer 330. Accelerometer 330 may be configured to provide acceleration readings for Device 300. Acceleration data provided by Accelerometer 330 may be utilized to determine a mobility status of a user of Device 300, such as walking riding a vehicle, or the like. In some exemplary embodiments, Accelerometer 330 readings may be used to identify whether the user of Device 300 is in an elevator, whether the elevator is ascending or descending, whether the user is climbing stairs and in what direction, or the like. In some cases, the readings of Accelerometer 330 may be indicative of a period of time in which the Device 300 is ascending or descending, and a rate in which the altitude changes. For example, readings from Accelerometer may be used to determine that Device 300 is in an elevator ascending at a speed of 10 meter per second for a duration of twenty seconds. Such indication may be used to compute that the current altitude of the Device 300 is 200 m above the previous altitude. The relative change in altitude may be measured from an absolute altitude, providing a current absolute altitude estimation. Additionally or alternatively, the relative altitude may be tracked over time until reaching a first absolute altitude value, such as obtained using a Global Positioning System (GPS) 340, and the absolute altitude values may be computed backwards based on the relative altitude changes. Additionally or alternatively, relative altitude changes may be computed and an absolute altitude may be computed based thereon. The computed absolute altitude may be later verified when a reading of an absolute altitude is available, such as using GPS 340. An error or deviation may be computed and used to improve a model used for estimation of relative altitude changes in the future.

Device 300 may comprise GPS 340. GPS 340 may be a positioning module configured to obtain a position of Device 300. GPS 340 may determine the location of Device 300 by triangulating signals from different sources, such as from various satellites. GPS 340 may be limited indoors and may not be able to obtain a position when there is no line of sight to the satellites. Other positioning modules may be used as well, such as based on cell tower triangulations. In some cases, GPS 340 may provide for a relatively accurate position, such as having an error of no more than about 5-10 meters.

Device 300 may comprise Microphone 350. Microphone 350 may be configured to record audio signals in the vicinity of Device 300. In some cases, two mobile device may obtain audio signals and compare them to determine whether the devices are located in a same area. In some cases, the obtained audio may be filtered to exclude foreground sound and include only background noise. In some cases, the frequencies which compose the signal may be compared, such as using a Fourier Transform computation. Additionally or alternatively, two matching sequences of audio samples at various timings may be used to determine co-location of the devices. The matching sequences may match in the sequence of audio-based signatures. Additionally or alternatively, each pair of matching signatures may also be required to match timewise, such as obtained at the same time with a relatively small sampling error, such as of less than about 500 ms, about 100 ms, about 10 ms, or the like. Additionally or alternatively, locations within a same building may be distinguishable based on ambient audio emitted therein. The ambient audio may be a semi-unique signature of an area within a building, and may be assumed to identify in a unique manner the area. In some cases, ambient audio may be extracted from the audio signal and correlated with known signatures together with the use of comparing the foreground to other audio signals that were captured at the same time by other devices.

Device 300 may comprise a Wi-Fi Receiver 360. Wi-Fi Receiver 360 may be configured to obtain signals by Wi-Fi-based networks and connect thereto. In some cases, Wi-Fi Receiver 360 may be configured to determine which Wi-Fi networks are available at a present location, and determine signal strength of each such network. The information obtained by the Wi-Fi Receiver 360 may be used to determine whether two devices are located at a same area, such as within 100 m from one another or less. In some cases, if two devices sense the same set of Wi-Fi networks, it may be determined that they are both located in the same area. In some cases, increased accuracy may be obtained if the strength of the signals is also measured and compared. It will be noted that based on such measurements, it may be determined that both devices are at a same location, such as within 5 meters of one another, even without knowing what the location is or their relation to one another. In some cases, Wi-Fi signals at different floors of the same building may be significantly different, such as having different sets of Wi-Fi networks, or having a different combination of networks with strong signals, and may be used to deduce that two devices are located at a same floor. Using such deduction, an altitude of one device may be used to compute the altitude of the second device, which is located at the same floor.

In some exemplary embodiments, Device 300 may employ non-accurate location services to determine its location. Non-accurate location services, as opposed to GPS 340, may provide for a proximal location and not an accurate one. In some cases, accurate location may be a location with an error of no more than about 5 meters, 10 meters, or the like. A non-accurate location service may be a service providing a proximal location in the form of an area comprising a circle having a diameter of about 50 meters, about 100 meters, about 500 meters, or the like. The non-accurate location service may be based on triangulation of cell towers, Wi-Fi hotspots, dead-reckoning computation of a current location based on previous GPS readings and other sensor readings obtained thereafter, or the like.

Figure 4A:
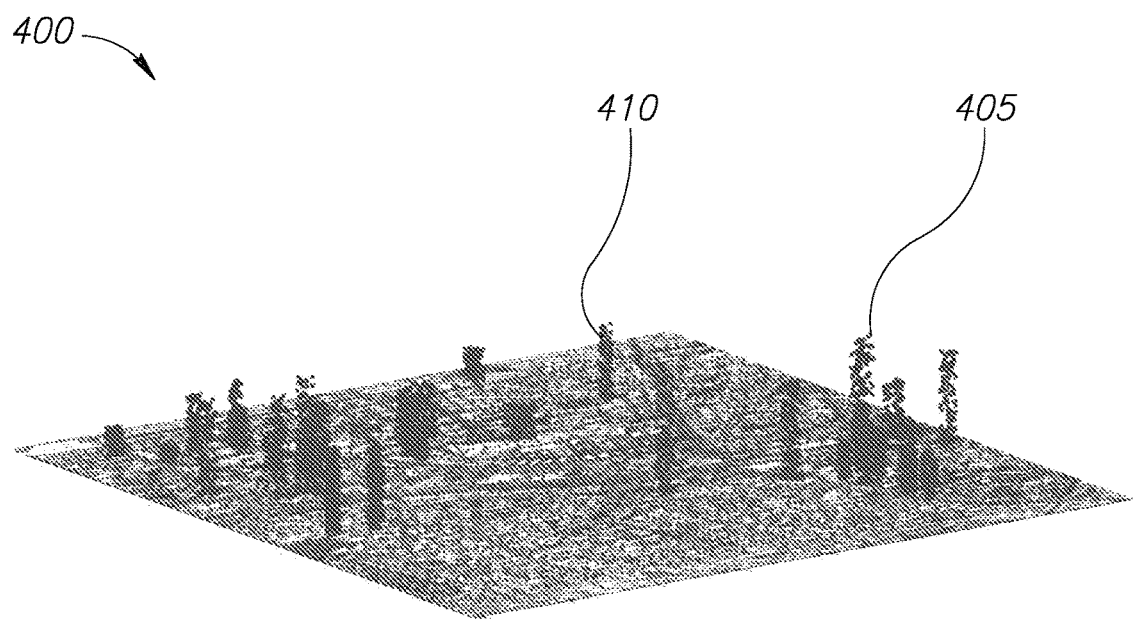
FIGS. 4A-4B show schematic illustrations of three-dimensional maps, in accordance with some exemplary embodiments of the disclosed subject matter.
Figure 4B:
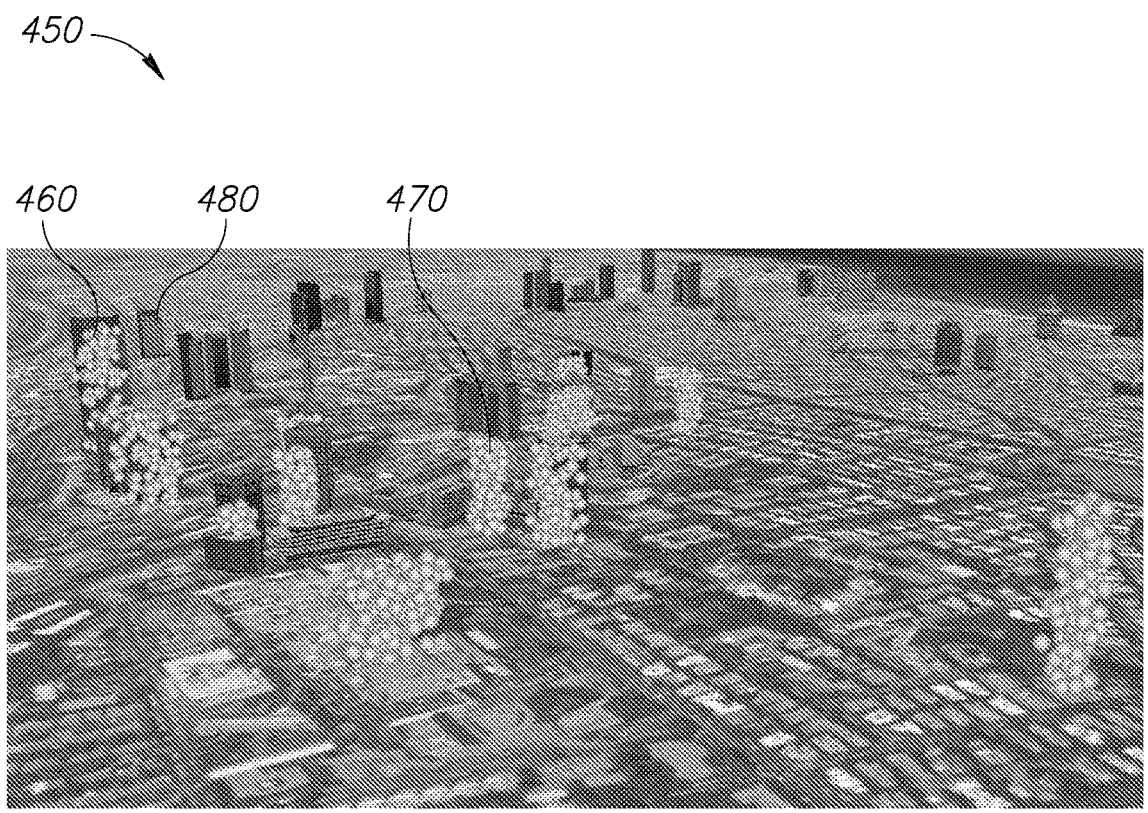

Referring now to FIGS. 4A-4B showing schematic illustrations of three-dimensional maps, in accordance with some exemplary embodiments of the disclosed subject matter.

In some exemplary embodiments, a three-dimensional Map 400 may be generated based on crowd-sourced data obtained from mobile devices of users. The crowd-sourced data may comprise samples, each of which indicating altitudes, latitudes and longitude. As an example, Sample 405 may indicate a position in which a device was located at a certain point in time. Sample 405 may be based on sensor readings of the mobile device, may be based on sensor fusion of several sensors of the same device or of several devices, or the like. Map 400 may visually display all the obtained samples, including samples which were obtained based on partial positioning readings which were augmented. As can be appreciated from Map 400, the samples may visually display the various surfaces in which users travel. Map 400 visually shows buildings, bridges, interchanges, tunnels, underground parking lots, or the like. As an example, Building 410 is visually displayed in Map 400.

Map 450 shows the three-dimensional map generated based on the samples, integrated with 3D models of structures. The 3D models may be obtained from external sources, such as available by GOOGLE™ EARTH™. The samples may verify the current existence of buildings and their models. The existence of Building 460 and Building 470 may be verified by the generated three-dimensional map, whereas the existence of Building 480 may be put into question. In some cases, portions of buildings may be closed to the public or completely inaccessible. Map 450 may visualize accessible portions from inaccessible portions.

In some exemplary embodiments, a visual depiction of a sample, such as 405, may represent a single sample. Additionally or alternatively, Sample 405 may be an aggregation of a plurality of samples having the same location. The size, shape, color, or other visual characteristic of Sample 405 may indicate the number of readings it represents. In some cases, green samples may be "lightweight" and represent few samples whereas red samples may be "heavy" are represent many readings. Maps 400, 450 may be displayed with respect to different times, such as at a specific time in the week (e.g., between 13:00-14:00 on Mondays). The visual depiction may exemplify population of each accessible surface at such times using a color scale, where red areas would indicate highly populated and green areas would indicate uninhibited surfaces. Same locations may be populated differently at different hours, such as the case with shopping malls which may be more populated over the weekends, and offices, which may be more populated during daytime in weekdays.

Figure 5A:
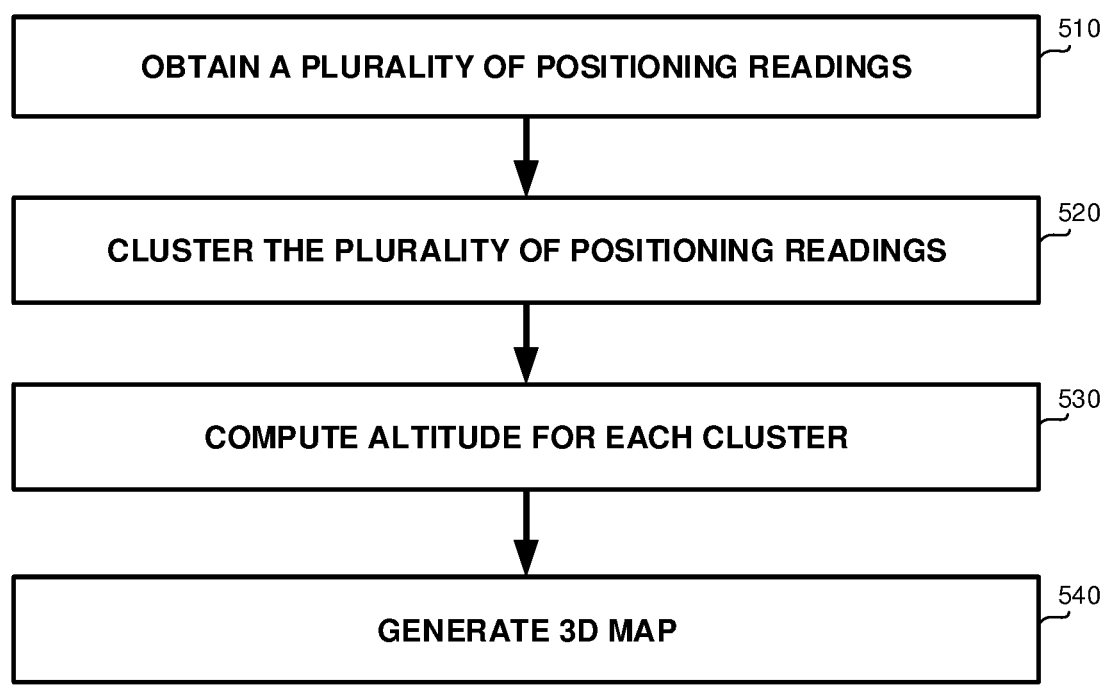
FIGS. 5A-5C show flowchart diagrams of methods, in accordance with some exemplary embodiments of the disclosed subject matter.

Referring now to FIG. 5A showing a flowchart diagram of a method, in accordance with some exemplary embodiments of the subject matter.

On Step 510, a plurality of positioning readings of a plurality of mobile devices may be obtained. In some exemplary embodiments, each reading of the plurality of positioning readings may be indicative of an altitude, latitude and longitude of a mobile device. Each reading may be determined using one or more sensors of the mobile device, such as but not limited to, GPS sensor, accelerometer, barometer, Wi-Fi sensor, or the like.

In some exemplary embodiments, the plurality of mobile devices may be heterogeneous mobile devices having different sets of sensors. As an example, one mobile device may have an accelerometer, a magnetic field sensor, and a gyroscope; and a second mobile device may have motion sensors, a Compass utilized along with a GPS sensor.

In some exemplary embodiments, the positioning readings may provide an accurate two-dimensional location, i.e., an accurate latitude and longitude. The accurate two-dimensional location may be determined based on GPS readings. An approximate altitude of the positioning reading may be determined using atmospheric pressure readings of a barometer, readings of an altimeter of a mobile device, or the like.

Additionally or alternatively, the positioning readings may provide non-accurate two-dimensional location, such as provided by location services sensors of a mobile device, optical sensors of a mobile device, or the like.

In some exemplary embodiments, the positioning readings may comprise partial positioning readings in which an altitude readings was originally unavailable. The partial positioning readings may have been completed by correlating their values with values of other readings, in accordance with the disclosed subject matter.

On Step 520, the plurality of positioning readings may be clustered, to determine clusters of positioning readings. Each cluster of positioning readings may comprise a group of positioning readings that are similar, such as based on a distance metric. Each cluster may comprise positioning readings that are approximately located in the same area. In some exemplary embodiments, vertical clusters, such generated in view of elevator shafts and stairways may be filtered out. Horizontal clusters, such as representing samples obtained in a same surface, may be utilized.

On Step 530, an altitude value may be computed for each cluster. In some exemplary embodiments, the altitude value may be computed based on an altitude of each positioning reading in the cluster. As an example, the altitude of the cluster may be the median, mean, average or a similar function of the altitudes in the cluster. Additionally or alternatively, the altitude may be computed based on a centroid of the cluster.

In some exemplary embodiments, the altitude value of the cluster may be attributed to a surface that is accessible to users. The altitude of the surface may be computed in relative accuracy even if the samples based on which it is determined are non-accurate and a result of non-accurate estimation having sampling errors. In some exemplary embodiments, given enough samples, the error rate may be insignificant and the actual altitude may be discovered as errors may negate one another.

On Step 540, a three-dimensional map may be generated based on the plurality of positioning readings and the altitude value of each cluster. In some exemplary embodiments, each sample in a cluster may be modified to have the altitude of the cluster, thereby adjusting all the altitude readings in the cluster to the estimated accurate surface altitude. In some exemplary embodiments, the three-dimensional map may be a dynamic map representing dynamic population distribution in different altitudes of a single location in the dynamic map. As an example, the single location may be a building. The dynamic map may show a population of each floor of the building.

In some exemplary embodiments, the plurality of positioning readings and the altitude value of each cluster may be extrapolated to generate a three-dimensional representation of an object in the three-dimensional map, such as a representation of a building, a representation of a mountain, or the like.

Additionally or alternatively, positioning readings and altitude values sampled over time may be utilized to update additional information of objects in the three dimensional map, such as population in each surface, distribution of usage over time in different altitudes, analyzing behavior of the crowd in each three-dimensional location, updating new objects, or the like. In some cases, the surface altitude determined in the static map may be used in the dynamic map for the altitude of the surfaces, to ensure that a relatively low number of samples at certain times would not cause the surface altitude to change erroneously.

Additionally or alternatively, positioning readings and altitude values may be utilized to learn dynamic three-dimensional structures of roads, such as interchanges between roads, intersections, bridges, underground parking, or the like. The dynamic three-dimensional structures of roads may be utilized to update roads in the three-dimensional map, update traffic estimations, or the like.

Figure 5B:
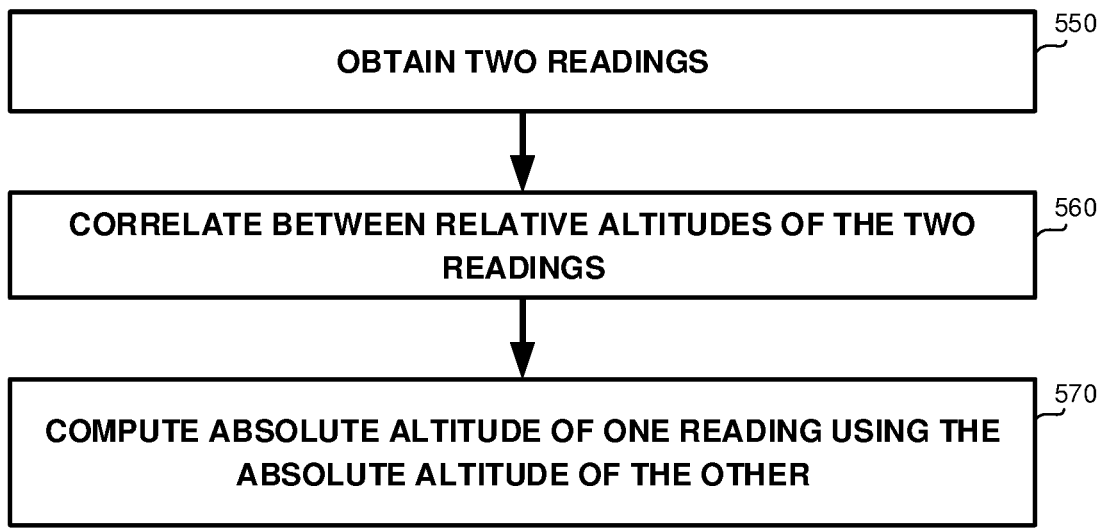

Referring now to FIG. 5B showing a flowchart diagram of a method, in accordance with some exemplary embodiments of the subject matter.

On Step 550, two positioning readings may be obtained. A first positioning reading may comprise an absolute altitude and a relative altitude. A second positioning reading may comprises a relative altitude and may not include any absolute altitude. In some exemplary embodiments, the two positioning readings may be positioning readings of different mobile device. Additionally or alternatively, the two positioning readings may be positioning readings of the same mobile device at different times.

In some exemplary embodiments, the first positioning reading and the second positioning readings may indicate locations at the same time point. Additionally or alternatively, the first reading may indicate a location at a time point that precedes a time point of a location indicated by the second reading, or vice versa.

In some exemplary embodiments, the relative altitude of the first reading may be a first barometer reading. The relative altitude of the second reading is may be second barometer reading. A time difference between the first barometer reading and the second barometer reading may be below a threshold, such as below about 1 day, below about 10 hours, below about 5 hours, or the like. The threshold may be consistent with a rate of change in atmospheric pressure in the geographical location measured at the relevant time (e.g., season, weather conditions, or the like).

It may be appreciated that barometer readings sampled in between the first barometer reading and the second barometer reading, may exclude device-induced atmospheric pressure change. The barometer readings may be normalized to eliminate the influence of the device-induced atmospheric pressure change.

In some exemplary embodiments, the first positioning reading may be determined using a GPS sensor, and the second positioning reading may be determined without using of any GPS sensor. The GPS sensor may provide an exact location of the mobile device and accordingly an accurate absolute altitude reading.

Additionally or alternatively, the first and the second positioning readings may include readings that are determined using non-accurate location services of a mobile device. The non-accurate location services may provide potential positioning areas having a diameter of at least about 50 meters. The non-accurate location services may estimate the potential positioning areas based on previous locations determined by GPS sensors, weakly connected GPS satellites that estimate location within a few meters, estimating a location of nearby Wi-Fi networks, connection to a cellular network that may be accurate up to a few thousand meters, or the like.

Additionally or alternatively, the first and the second positioning reading may be determined based on a combination of different location sensors. As an example, the positioning readings may be determined based on GPS sensors, which may provide an accurate positioning, which generally works outdoors and can take between several seconds to several minutes to establish a fix. As another example, the positioning readings may be determined based on cell tower multilateration, which may provide a fast reading, work in locations with a cell signal; but its accuracy may be highly variable depending on signal strength and interference, distance from cell towers, obstacles, and the total number of cell towers in range of the mobile device. As yet another example, the positioning readings may be determined using Wi-Fi Base Station Location sensors, which determine location based on a connection to a Wi-Fi network, and may often be inaccurate. The positioning readings may be determined based on a combination of the above examples sensors, additional sensors, or the like.

On Step 560, correlation between the relative altitude of the first positioning reading and the relative altitude of the second positioning reading may be performed. Using the correlation, absolute altitude of the second reading may be computed (570).

In some exemplary embodiments, the relative altitude of the first positioning reading and the relative altitude of the second positioning reading may be determined to be equal. In such a case, the absolute altitude of the second reading may be set to be the same absolute altitude of the first reading.

Additionally or alternatively, the relative altitude of the first positioning reading and the relative altitude of the second positioning reading may be different. The difference between the relative altitudes may indicate a difference between absolute altitudes of the two readings, such as altitude difference between the two readings.

In some exemplary embodiments, the correlation between the relative altitudes of the first and the second positioning readings may be performed based on the first and the second positioning readings being in a same proximal location. As an example, the first and the second positioning readings may comprise a first and a second Wi-Fi sensor readings, respectively. Based on indicating that the first and the second Wi-Fi sensor readings are connected a same Wi-Fi network, an indication that the first and the second readings are readings in a same proximal location may be performed. A more accurate correlation may be performed, in case signal strength level of the Wi-Fi network are also utilized. As an example, the first Wi-Fi sensor reading may comprises a first signal strength level, and the second Wi-Fi sensor reading comprises a second signal strength level. A level difference between the first and second signal strength levels may be determined. In case that the level difference is below a predetermined threshold, such as s below 10 dB-microvolts per meter (dBuV/m), 20 dBuV/m, 50 dBuV/m, or the like; an indication that the first and the second readings are readings in a same proximal vertical location may be performed.

Additionally or alternatively, the correlation between the relative altitudes of the two readings may be performed using additional sensor readings, such camera shots, voice recordings, microphone readings, or the like. As an example, the first and the second positioning readings may comprise a first and a second voice recordings captured by a first and a second microphones. The first and the second voice recordings may be compared. In case similar effects, similar voices, similar tones, or the like are determined between the positioning readings, a determination that the first and the second positioning readings are located within a same area, may be performed. Similarly, visual imagery may be analyzed to determine similar location.

In some exemplary embodiments, the first positioning reading may indicate a location at a first time point, wherein the second positioning reading indicates a location at a later second time point. Additionally or alternatively, the second time point may precede the first time point. A reading of a later point in time, may be utilized to determine absolute altitude of a reading at an earlier point in time. As a result, in some cases, partial readings may be accumulated and completed later on using readings that are not available when the partial reading is obtained.

Figure 5C:
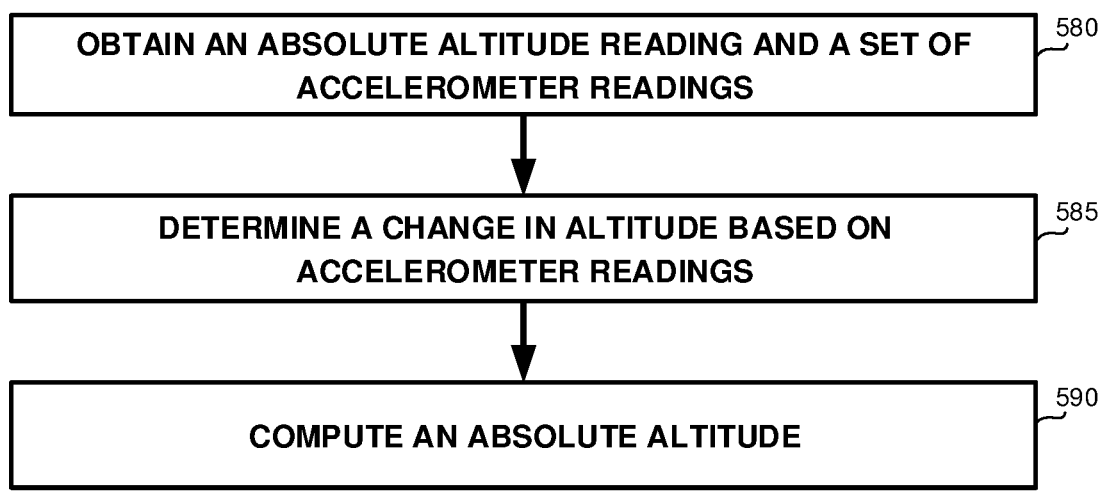

Referring now to FIG. 5C showing a flowchart diagram of a method, in accordance with some exemplary embodiments of the subject matter.

On Step 580, an absolute altitude reading and a set of accelerometer readings may be obtained from a mobile device. The absolute altitude reading and the set and accelerometer readings may be comprised by the positioning readings obtained on Step 510 of FIG. 5A. The set of accelerometer readings may comprise readings of linear acceleration of movement of the mobile device. The set of accelerometer readings may be obtained by an accelerometer of the mobile device, which may measure tilts, motions, or the like of the mobile device, and compute an acceleration based on differences between different readings.

In some exemplary embodiments, the set of accelerometer readings may succeed the absolute altitude reading in time, such as may comprise continuous measurements from the accelerometer obtained after the absolute altitude was established.

On Step 585, a change in altitude of the mobile device may be determined based on the set of accelerometer readings. In some exemplary embodiments, determining the change may be performed by a classifier. The classifier may be configured to determine the change in the altitude of the mobile device based on one or more accelerometer reading of the set of accelerometer readings. In some exemplary embodiments, the classifier may label frames of accelerometer readings to correlate to a mobility state of the mobile device. The mobility state may indicate a rate of change in altitude, such as no change, ascending at 1 m/sec, descending at 5 m/sec, or the like. Based on the aggregation of the altitude changes indicated in all of the frames which followed the absolute altitude, a total change in altitude may be computed.

In some exemplary embodiments, the classifier may be trained based on a training set comprising pairs of frames of accelerometer readings and labels thereof obtained using one or more devices. Each label of a frame in the training set may be an altitude change computed based on barometer readings obtained by the same device providing the accelerometer readings of the frame. In some exemplary embodiments, the labels may be based on user input, such as users indicating climbing stairs or riding elevators, based on visual input, such as analyzing images captured while riding elevators, or the like.

On Step 590, an absolute altitude of the mobile device may be computed based on absolute altitude reading and on the change in altitude. In some exemplary embodiments, the computed absolute altitude may be an estimation which may have a potential sampling error, as it may be based on an inaccurate altitude change estimation.

Figure 6A:
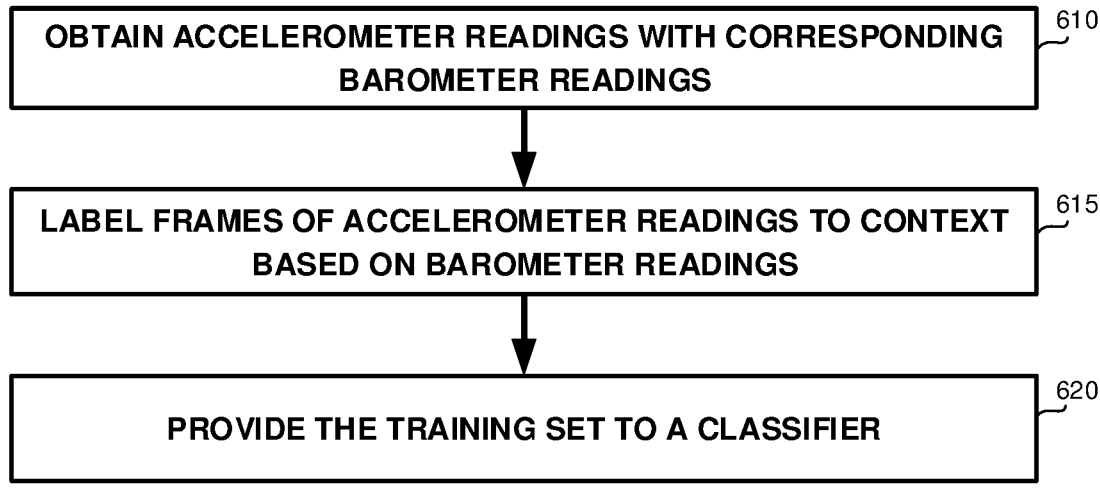
FIGS. 6A-6B show flowchart diagrams of methods, in accordance with some exemplary embodiments of the disclosed subject matter.

Referring now to FIG. 6A showing a flowchart diagram of a method, in accordance with some exemplary embodiments of the disclosed subject matter.

On Step 610, frames of accelerometer readings with corresponding barometer readings may be obtained. Each frame of accelerometer reading and corresponding barometer reading may be obtained by a same mobile device, such as Barometer 320 and Accelerometer 330 of Device 300; in a same timeframe.

In some exemplary embodiments, in order to improve prediction by a classifier, some frames may be omitted from computation. In cases where barometer readings indicate device-induced atmospheric pressure changes, the corresponding frame may be dropped as the barometer readings therein may be unreliable.

On Step 615, frames of accelerometer readings may be labeled to context, based on barometer readings. Each frame of accelerometer readings may be labeled based on the altitude change that can be extracted from the respective barometer readings. In some exemplary embodiments, barometer reading at the beginning and at the end of the frame may indicate an altitude change. Additionally or alternatively, a curve of the atmospheric pressure may be computed based on more than two barometer readings. In some exemplary embodiments, based on the altitude change, based on characteristics of the curve of the atmospheric pressure (e.g., curvature, smoothness, derivation, or the like), or the like, a context of the frame may be determined. In some exemplary embodiments, a general context of the frame may be inputted by user or obtained based on other sensors, and the altitude change corresponding to the context may be computed based on the barometer readings. For example, the user may indicate "riding an elevator" general context, while the speed of the elevator's decent may be computed automatically. Such speed may be of importance to distinguish between riding slow elevators and fast elevators, which may exhibit different accelerometer readings. Hence, the label may indicate the context of "riding an elevator descending at 1 m/sec", based on the general context and an altitude change of 0.5 m during a frame of 0.5 seconds.

On Step 620, the training set may be provided to a classifier. The classifier may be trained using the training set. The trained classifier may be configured to predict a label for a frame of accelerometer readings. The label may include a general context or may exclude such context. The label may include a speed and direction of vertical movement during the frame. The classifier may be trained using any supervised learning techniques, such as but not limited to Support Vector Machines (SVM), random forest, decision tree learning, maximum entropy classifier, or the like.

Figure 6B:
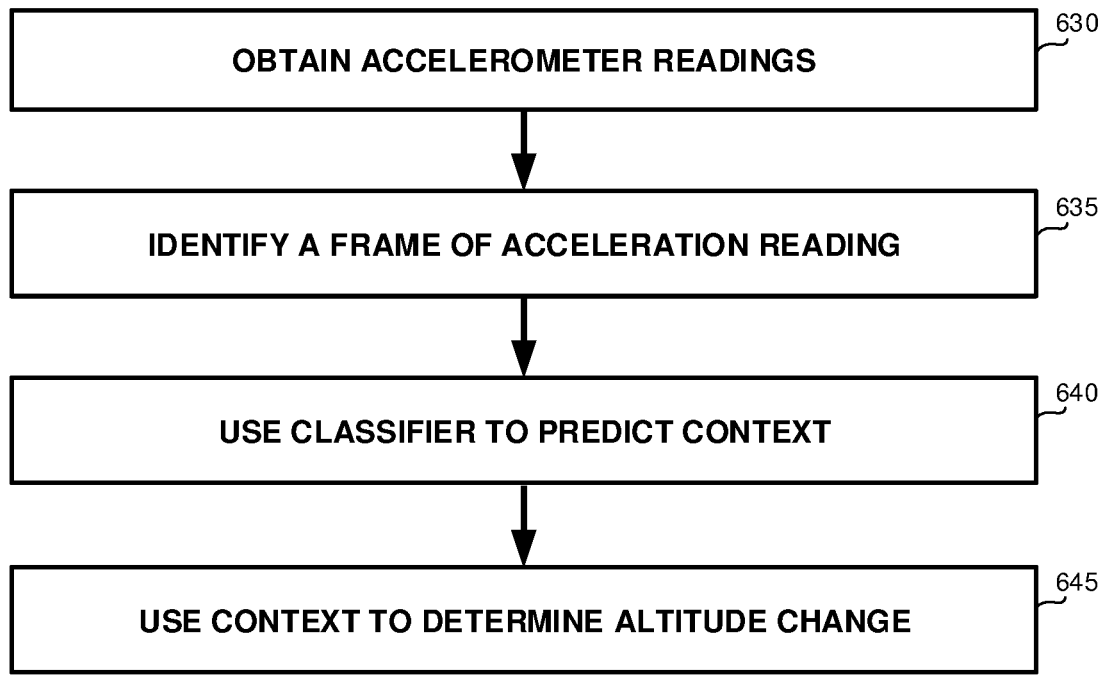

Referring now to FIG. 6B showing a flowchart diagram of a method, in accordance with some exemplary embodiments of the disclosed subject matter.

Accelerometer readings may be obtained (630). One or more frames of acceleration readings may be identified (635). The frame of acceleration readings may comprise acceleration readings within a predefined timeframe, such as 100 ms, 50 ms, 10 ms, or the like. In some exemplary embodiments, the total accelerometer readings may be segmented into frames based on the predetermined size or duration of the frame.

On Step 640, the classifier may be used to predict a context of each frame identified in Step 635. The estimated context may be a predicted label for the frame. The estimated context may indicate a change in altitude during the frame.

On Step 645, the context may be used to determine an altitude change throughout the accelerometer readings. In some exemplary embodiments, the altitude change may be a summation of the altitude changes in each frame, as estimated by the classifier.

Figure 6C:
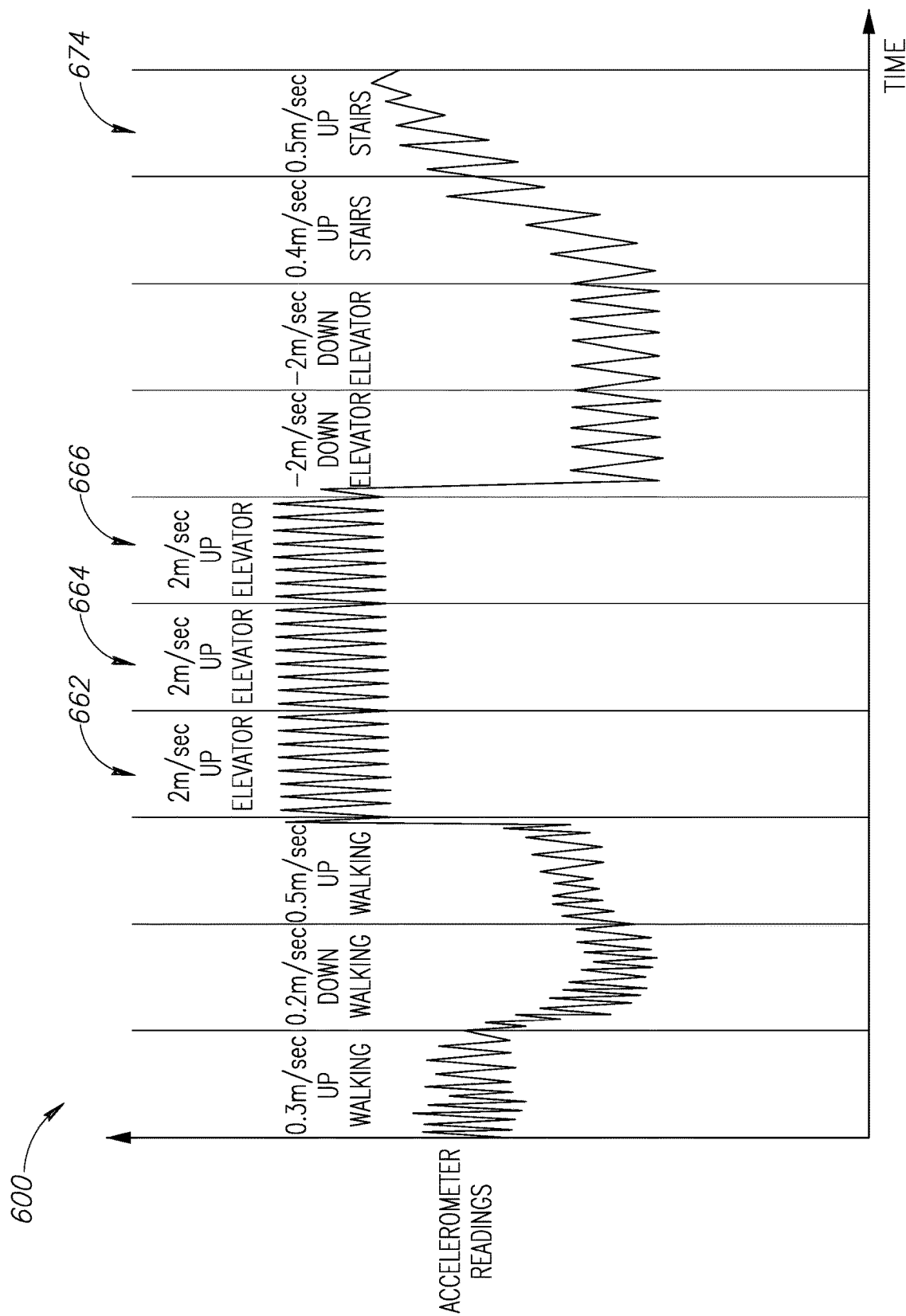
FIG. 6C shows a schematic accelerometer curve with labeled frames, in accordance with some exemplary embodiments of the disclosed subject matter.

Referring now to FIG. 6C showing a schematic accelerometer curve with labeled frames, in accordance with some exemplary embodiments of the disclosed subject matter.

Curve 600 may illustrate readings of an accelerometer over time. Curve 600 may be segmented into frames. Each frame may be labeled with a label indicating its context. For example, Frame 662 indicates a context of riding an elevator going up in a speed of 2 m/sec. Similarly, Frames 664 and 666 indicate the same context as Frame 662.

Other frames may exhibit different context. For example, Frame 674 is associated with the context of climbing up the stairs at a pace of 0.4 m/sec.

In some exemplary embodiments, the labels shown in Curve 600 are labels determined based on barometer readings, readings of other sensors, user input, or the like. Such labels may be used in a training set for a supervised classifier. Additionally or alternatively, Curve 600 may represent accelerometer readings obtained from a device, and the labels thereof are predicted using the supervised classifier. Assuming each frame represents one second, accelerometer readings shown in Curve 600, may represent a total change in altitude of +0.3−0.2+0.5+2+2+2−2−2+0.4+0.5=3.5 meters, which is exhibited over ten seconds. Based on such readings and predicted labels, and given an absolute altitude at immediately before the first frame, the absolute altitude at the end of the tenth frame (or any other intermediate frame) may be computed. Additionally or alternatively, given an absolute altitude at the beginning of Frame 674, absolute altitudes at the beginning of each other frame may be estimated.

It will be noted, that some frames may be indicative of no altitude change, such as walking in a plain, riding a bike in a plain, or the like.

Figure 7:
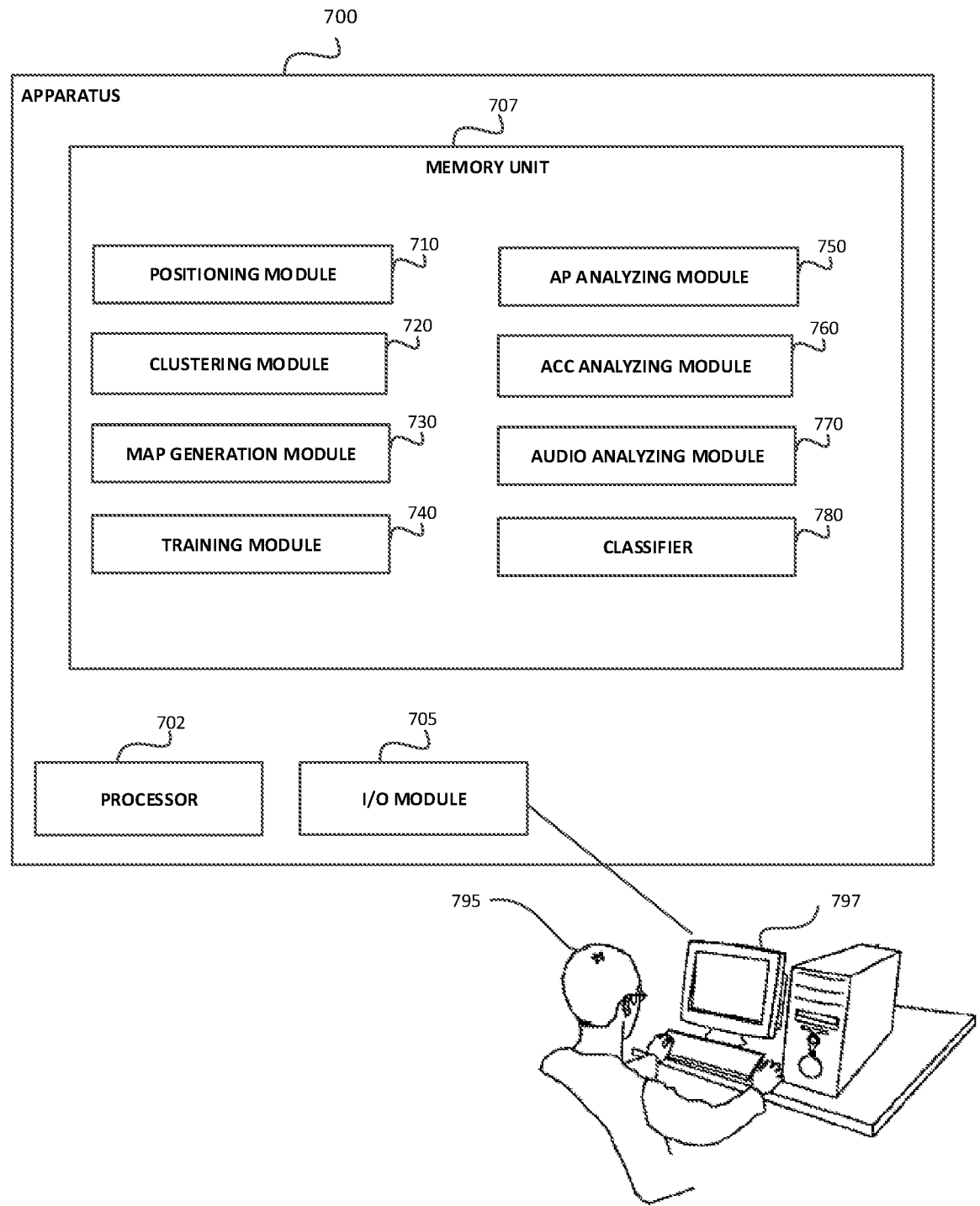
FIG. 7 shows a block diagram of an apparatus, in accordance with some exemplary embodiments of the disclosed subject matter.

Referring now to FIG. 7 showing an apparatus, in accordance with some exemplary embodiments of the disclosed subject matter.

An Apparatus 700 may be configured to support parallel user interaction with a real world physical system and a digital representation thereof, in accordance with the disclosed subject matter.

In some exemplary embodiments, Apparatus 700 may be designated to generate three-dimensional maps, generate dynamic maps, update existing three-dimensional maps, add a third dimension to two-dimensional map, or the like. It may be appreciated that Apparatus 700 may be utilized for other uses as well and the disclosed subject matter is not limited to any particular usage.

In some exemplary embodiments, Apparatus 700 may comprise one or more Processor(s) 702. Processor 702 may be a Central Processing Unit (CPU), a microprocessor, an electronic circuit, an Integrated Circuit (IC) or the like. Processor 702 may be utilized to perform computations required by Apparatus 700 or any of it subcomponents.

In some exemplary embodiments of the disclosed subject matter, Apparatus 700 may comprise an Input/Output (I/O) Module 705. Apparatus 700 may utilize I/O Module 705 as an interface to transmit and/or receive information and instructions between Apparatus 700 and external I/O devices, such as a Workstation 797, computer networks (not shown), or the like. I/O Module 705 may be utilized to provide an output to and receive input from a user, such as, for example obtaining external sensors readings, obtaining training sets utilized for machine learning, obtaining initial maps, provide three-dimensional maps, providing information related to location in the three-dimensional maps, or the like. It will be appreciated that Apparatus 700 can operate automatically without human intervention.

In some exemplary embodiments, I/O Module 705 may be configured to obtain a plurality of positioning readings of a plurality of mobile devices. Each reading may be determined using one or more sensors of a mobile device. The plurality of positioning readings may comprise for example, a timestamp, a barometer reading, an accelerometer reading, a GPS reading, location services output, or the like. Additionally or alternatively, I/O Module 705 may be configured to obtain audio files, such as raw audio data, microphone records, or the like.

In some exemplary embodiments, Apparatus 700 may comprise Memory 707. Memory 707 may be a hard disk drive, a Flash disk, a Random Access Memory (RAM), a memory chip, or the like. In some exemplary embodiments, Memory 707 may retain program code operative to cause Processor 702 to perform acts associated with any of the subcomponents of Apparatus 700.

A Positioning Module 710 may be configured analyze the plurality of positioning readings obtained by I/O Module 705, to determine an altitude, latitude and longitude of mobile devices.

In some exemplary embodiments, Positioning Module 710 may be configured to analyze different types of positioning readings in order to determine the altitude, latitude and longitude of the mobile device or location. The different types of positioning readings may comprise for example, GPS sensor readings, non-accurate location services readings, barometer readings, accelerometer readings, or the like. In some exemplary embodiments, Positioning Module 710 may utilize other components of Apparatus 700 to analyze sensors input and determine the positioning of the mobile device. Such components may be described later in the description of FIG. 7, such as AP Analyzing Module 750, ACC Analyzing Module 760, Voice Analyzing Module 770, or the like.

In some exemplary embodiments, Positioning Module 710 may be configured to analyze pairs of positioning readings, to determine an absolute altitude of one positioning reading based on an absolute altitude of the other positioning reading. Positioning Module 710 may be configured to correlate between relative altitudes of the pair of positioning readings to determine the absolute altitude of the one positioning reading. It may be noted that the pair of positioning readings may comprise readings of the same mobile device, readings of two different mobile devices, readings of mobile devices of different types, readings of different sensors, or the like. It may further be noted that the pair of positioning readings may indicate a location at the same time point by different sensors or different mobile devices, a location at different time points, or the like.

In some exemplary embodiments, Positioning Module 710 may be configured to utilize positioning readings of a later time point to determine positioning information of a location at an earlier time point, or vice versa.

In some exemplary embodiments, Positioning Module 710 may be configured to compare pairs of Wi-Fi sensor readings to indicate connection to a same Wi-Fi network and accordingly indicate that the associated positioning readings are readings in a same proximal location. Positioning Module 710 may be further configured to analyze signal strength levels of the Wi-Fi sensor readings, to determine that a level difference between the signal strength levels is below a predetermined threshold, and accordingly determine that the associated positioning readings are readings in a same proximal location.

A Clustering Module 720 may be configured to cluster the plurality of positioning readings to determine clusters of positioning readings. Clustering may be performed using an unsupervised clustering algorithm.

In some exemplary embodiments, Clustering Module 720 may be configured to compute an altitude value for each cluster. Clustering Module 720, may be configured to compute the altitude value based on an altitude of each positioning reading in the cluster, such as based on a median value, based on a centroid of the cluster, or the like.

A Map Generation Module 730 may be configured to generate a three-dimensional map based on the plurality of positioning readings and the altitude value of each cluster. In some exemplary embodiments, Map Generation Module 730 may be configured to generate or update dynamic three-dimensional maps. The dynamic three-dimensional maps may represent dynamic population distribution in different altitudes of locations in the dynamic map. Map Generation Module 730 may be configured to update population of each floor of a building in the generated map based on a time criteria.

An Atmospheric Pressure (AP) Analyzing Module 750 may be configured to analyze atmospheric pressures, such as obtained by a barometer. AP Analyzing Module 750 may be configured to determine an absolute or a relative altitude of the reading based on the atmospheric pressure of the reading.

In some exemplary embodiments, AP Analyzing Module 750 may be configured to analyze barometer readings of one or more mobile devices to determine an atmospheric pressure, relative altitude associated with the atmospheric pressure, absolute altitude associated with atmospheric pressure in the barometer readings, or the like. AP Analyzing Module 750 may be configured to compare barometer reading with a time difference that is below a threshold, to determine associated altitudes. In some exemplary embodiments, AP Analyzing Module 750 may be configured to identify a device-induced atmospheric pressure change in a sequence of atmospheric pressure readings. Such readings may be dropped. Additionally or alternatively, AP Analyzing Module 750 may be configured to reduce device-induced atmospheric pressure changes from the barometer readings, in order to infer exact atmospheric pressure readings.

An Accelerometer (ACC) Analyzing Module 760 may be configured to analyze accelerometer readings obtained by a mobile device, in order to determine an altitude of the mobile device. In some exemplary embodiments, ACC Analyzing Module 760 may determine a context of the mobile device based on the accelerometer readings. ACC Analyzing Module 760 may determine the altitude based on the context of the mobile device. The context may be, for example, a mobility status of the mobile device, such as carried by a walking person, a person who is riding a vehicle, being in an elevator, or the like. Additionally or alternatively, the context may indicate a rate and direction of altitude change.

Additionally or alternatively, ACC Analyzing Module 760 may be configured to determine an absolute altitude of the mobile device, based on a set of accelerometer readings of the mobile device, that can be converted to an aggregated change in altitude of the mobile device. The aggregated change in altitude may be combined with an absolute altitude value to compute the absolute altitude based on the accelerometer readings.

An Audio Analyzing Module 770 may be configured to analyze audio recordings captured by microphones of one or more mobile devices. In some exemplary embodiments, Audio Analyzing Module 770 may be configured to compare pairs of audio recordings to determine similarity therebetween, such as by determining similar sounds, similar vocal effects, similar tones, or the like. Audio Analyzing Module 770 may be configured to determine that a pair of positioning readings that comprise a similar s audio recordings, are located within a same area.

A Classifier 780 may be configured to predict a context based on a frame of accelerometer readings. The context may be indicative of a speed and direction of a change in altitude by the mobile device during the frame. Classifier 780 may be configured to use the context to determine a relative altitude of the mobile device.

A Training Module 740 may be configured to train Classifier 780. In some exemplary embodiments, Training Module 740 may be configured to correlate between analysis of barometer readings performed by AP Analyzing Module 750, and accelerator readings analyzed by ACC Analyzing Module 760. Training Module 740 may be configured to determine a label for each frame of accelerometer readings based on the barometer reading at the same time. The label may be a context label, an altitude label, or the like. Training Module 740 may be configured to generate a training set using the accelerometer readings and labels thereof. Additionally or alternatively, the labels for the training set may be provided from additional or alternative sources, such as explicit user input, based on image analysis, or the like. Training Module 740 may be configured to train Classifier 780 using the training set.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for generating a three-dimensional map, the method comprising:

obtaining a plurality of positioning readings of a plurality of mobile devices, wherein each reading of the plurality of positioning readings is indicative of an altitude, latitude and longitude of a mobile device, wherein the each reading is determined using one or more sensors of the mobile device, wherein the plurality of positioning readings comprises an absolute altitude reading of a mobile device and a set of accelerometer readings obtained from the mobile device, wherein the set of accelerometer readings succeeds in time the absolute altitude reading, wherein said obtaining comprises:

determining, based on the set of accelerometer readings, a change in altitude of the mobile device; and computing, based on the absolute altitude reading and on the change in altitude, an absolute altitude of the mobile device;

clustering the plurality of positioning readings to determine clusters of positioning readings;

for each cluster, computing an altitude value, based on an altitude of each positioning reading in the cluster, whereby determining an estimated altitude based on non-accurate altitude readings; and generating the three-dimensional map, wherein said generating is based on the plurality of positioning readings and the altitude value of each cluster.

2. The method of claim 1, wherein the plurality of positioning readings comprises a first positioning reading and a second positioning reading, wherein the first positioning reading comprises an absolute altitude and a relative altitude, wherein the second positioning reading comprises a relative altitude;

wherein said method further comprising:

correlating between the relative altitude of the first positioning reading and the relative altitude of the second positioning reading; and determining, based on said correlating and based on the absolute altitude of the first positioning reading, an absolute altitude of the second positioning reading.

3. The method of claim 2, wherein the first positioning reading and the second positioning reading are positioning readings of a same mobile device of the plurality of mobile devices.

4. The method of claim 3, wherein the relative altitude of the first positioning reading and the relative altitude of the second positioning reading are equal.

5. The method of claim 3, wherein the relative altitude of the first positioning reading and the relative altitude of the second positioning reading are different.

6. The method of claim 2, wherein the first positioning reading indicates a location at a first time point, wherein the second positioning reading indicates a location at a second time point, wherein the first time point precedes the second time point.

7. The method of claim 2, wherein the first positioning reading indicates a location at a first time point, wherein the second positioning reading indicates a location at a second time point, wherein the second time point precedes the first time point, whereby utilizing a reading of a later point in time to determine absolute altitude of a reading at an earlier point in time.

8. The method of claim 2, wherein the first positioning reading is determined using a Global Positioning System (GPS) sensor, wherein the second positioning reading is determined without using of any GPS sensor.

9. The method of claim 2, wherein the first positioning reading comprises a first Wi-Fi sensor reading, wherein the second positioning readings comprises a second Wi-Fi sensor reading, wherein the first and the second Wi-Fi sensor readings indicate connection to a same Wi-Fi network, whereby indicating that the first and the second readings are readings in a same proximal location.

10. The method of claim 9, wherein the first Wi-Fi sensor reading comprises a first signal strength level, wherein the second Wi-Fi sensor reading comprises a second signal strength level, wherein a level difference between the first and second signal strength levels is below a predetermined threshold.

11. The method of claim 2, wherein the first positioning reading comprises a first voice recording captured by a microphone, wherein the second positioning reading comprises a second voice recording captured by the microphone or by a second microphone, wherein the method further comprises:

determining that the first and the second positioning readings are located within a same area, wherein said determining is performed based comparing the first voice recording and the second voice recording.

12. The method of claim 2, wherein the first and the second positioning reading are determined using a non-accurate location service, wherein the non-accurate location service provides potential positioning areas having a diameter of at least about 50 meters.

13. The method of claim 2, wherein the relative altitude of the first reading is a first barometer reading, wherein the relative altitude of the second reading is a second barometer reading, wherein a time difference between the first barometer reading and the second barometer reading is below a threshold.

14. The method of claim 13, wherein barometer readings sampled in between the first barometer reading and the second barometer reading exclude device-induced atmospheric pressure change.

15. The method of claim 1, wherein said determining is performed by a classifier, wherein the classifier is configured to determine the change in the altitude of the mobile device based on one or more accelerometer reading of the set of accelerometer readings, wherein the classifier is trained based on a training set comprising pairs of accelerometer readings and labels thereof obtained using one or more devices, wherein each label of an accelerometer reading in the training set is an altitude change computed based on barometer readings, wherein the barometer reading and the accelerometer reading are obtained by a same device of said one or more devices.

16. The method of claim 1, wherein the plurality of mobile devices are heterogeneous mobile devices having different sets of sensors.

17. The method of claim 1, wherein the three-dimensional map is a dynamic map, wherein the dynamic map represents dynamic population distribution in different altitudes of a single location in the dynamic map.

18. The method of claim 17, wherein the single location is a building, wherein the dynamic map shows a population of each floor of the building.

19. An apparatus having a processor and memory, wherein said apparatus is connectable over a computer network to a plurality of mobile devices, wherein the processor being adapted to perform a method comprising:

obtaining a plurality of positioning readings of the plurality of mobile devices, wherein each reading of the plurality of positioning readings is indicative of an altitude, latitude and longitude of a mobile device, wherein the each reading is determined using one or more sensors of the mobile device, wherein the plurality of positioning readings comprises an absolute altitude reading of a mobile device and a set of accelerometer readings obtained from the mobile device, wherein the set of accelerometer readings succeeds in time the absolute altitude reading, wherein said obtaining comprises;
  determining, based on the set of accelerometer readings, a change in altitude of the mobile device; and
  computing, based on the absolute altitude reading and on the change in altitude, an absolute altitude of the mobile device;
  clustering the plurality of positioning readings to determine clusters of positioning readings;
  for each cluster, computing an altitude value, based on an altitude of each positioning reading in the cluster, whereby determining an estimated altitude based on non-accurate altitude readings; and
  generating the three-dimensional map, wherein said generating is based on the plurality of positioning readings and the altitude value of each cluster.

20. The apparatus of claim 19,
wherein the plurality of positioning readings comprises a first positioning reading and a second positioning reading, wherein the first positioning reading comprises an absolute altitude and a relative altitude, wherein the second positioning reading comprises a relative altitude;
wherein said method further comprising:
  correlating between the relative altitude of the first positioning reading and the relative altitude of the second positioning reading; and
  determining, based on said correlating and based on the absolute altitude of the first positioning reading, an absolute altitude of the second positioning reading.

21. The apparatus of claim 20, wherein the first positioning reading is determined using a Global Positioning System (GPS) sensor, wherein the second positioning reading is determined without using of any GPS sensor.

22. The apparatus of claim 20, wherein the first positioning reading comprises a first Wi-Fi sensor reading, wherein the second positioning readings comprises a second Wi-Fi sensor reading, wherein the first and the second Wi-Fi sensor readings indicate connection to a same Wi-Fi network, whereby indicating that the first and the second readings are readings in a same proximal location.

23. The apparatus of claim 20, wherein the first positioning reading comprises a first voice recording captured by a microphone, wherein the second positioning reading comprises a second voice recording captured by the microphone or by a second microphone, wherein the method further comprises:
  determining that the first and the second positioning readings are located within a same area, wherein said determining is performed based comparing the first voice recording and the second voice recording.

24. The apparatus of claim 20, wherein the first and the second positioning reading are determined using a non-accurate location service, wherein the non-accurate location service provides potential positioning areas having a diameter of at least about 50 meters.

25. The apparatus of claim 20, wherein the relative altitude of the first reading is a first barometer reading, wherein the relative altitude of the second reading is a second barometer reading, wherein a time difference between the first barometer reading and the second barometer reading is below a threshold.

26. The apparatus of claim 25,
wherein said determining is performed by a classifier, wherein the classifier is configured to determine the change in the altitude of the mobile device based on one or more accelerometer reading of the set of accelerometer readings, wherein the classifier is trained based on a training set comprising pairs of accelerometer readings and labels thereof obtained using one or more devices, wherein each label of an accelerometer reading in the training set is an altitude change computed based on barometer readings, wherein the barometer reading and the accelerometer reading are obtained by a same device of said one or more devices.

27. The apparatus of claim 19, wherein the plurality of mobile devices are heterogeneous mobile devices having different sets of sensors.

28. The apparatus of claim 19, wherein the three-dimensional map is a dynamic map, wherein the dynamic map represents dynamic population distribution in different altitudes of a single location in the dynamic map.

29. A computer program product comprising a non-transitory computer readable storage medium retaining program instructions, which program instructions when read by a processor, cause the processor to perform a method comprising:
  obtaining a plurality of positioning readings of a plurality of mobile devices, wherein each reading of the plurality of positioning readings is indicative of an altitude, latitude and longitude of a mobile device, wherein the each reading is determined using one or more sensors of the mobile device, wherein the plurality of positioning readings comprises an absolute altitude reading of a mobile device and a set of accelerometer readings obtained from the mobile device, wherein the set of accelerometer readings succeeds in time the absolute altitude reading, wherein said obtaining comprises:
    determining, based on the set of accelerometer readings, a change in altitude of the mobile device; and
    computing, based on the absolute altitude reading and on the change in altitude, an absolute altitude of the mobile device;
  clustering the plurality of positioning readings to determine clusters of positioning readings;
  for each cluster, computing an altitude value, based on an altitude of each positioning reading in the cluster, whereby determining an estimated altitude based on non-accurate altitude readings; and
  generating the three-dimensional map, wherein said generating is based on the plurality of positioning readings and the altitude value of each cluster.

30. The computer program product of claim 29,
wherein the plurality of positioning readings comprises a first positioning reading and a second positioning reading, wherein the first positioning reading comprises an absolute altitude and a relative altitude, wherein the second positioning reading comprises a relative altitude;
wherein said method further comprising:
  correlating between the relative altitude of the first positioning reading and the relative altitude of the second positioning reading; and
  determining, based on said correlating and based on the absolute altitude of the first positioning reading, an absolute altitude of the second positioning reading.

31. The computer program product of claim 30, wherein the first positioning reading and the second positioning reading are positioning readings of a same mobile device of the plurality of mobile devices.

32. The computer program product of claim 31, wherein the relative altitude of the first positioning reading and the relative altitude of the second positioning reading are equal.

33. The computer program product of claim 31, wherein the relative altitude of the first positioning reading and the relative altitude of the second positioning reading are different.

34. The computer program product of claim 30, wherein the first positioning reading indicates a location at a first time point, wherein the second positioning reading indicates a location at a second time point, wherein the first time point precedes the second time point.

35. The computer program product of claim 30, wherein the first positioning reading indicates a location at a first time point, wherein the second positioning reading indicates a location at a second time point, wherein the second time point precedes the first time point, whereby utilizing a reading of a later point in time to determine absolute altitude of a reading at an earlier point in time.

36. The computer program product of claim 30, wherein the first positioning reading is determined using a Global Positioning System (GPS) sensor, wherein the second positioning reading is determined without using of any GPS sensor.

37. The computer program product of claim 30, wherein the first positioning reading comprises a first Wi-Fi sensor reading, wherein the second positioning readings comprises a second Wi-Fi sensor reading, wherein the first and the second Wi-Fi sensor readings indicate connection to a same Wi-Fi network, whereby indicating that the first and the second readings are readings in a same proximal location.

38. The computer program product of claim 37, wherein the first Wi-Fi sensor reading comprises a first signal strength level, wherein the second Wi-Fi sensor reading comprises a second signal strength level, wherein a level difference between the first and second signal strength levels is below a predetermined threshold.

39. The computer program product of claim 30, wherein the first positioning reading comprises a first voice recording captured by a microphone, wherein the second positioning reading comprises a second voice recording captured by the microphone or by a second microphone, wherein the method further comprises:
   determining that the first and the second positioning readings are located within a same area, wherein said determining is performed based comparing the first voice recording and the second voice recording.

40. The computer program product of claim 30, wherein the first and the second positioning reading are determined using a non-accurate location service, wherein the non-accurate location service provides potential positioning areas having a diameter of at least about 50 meters.

41. The computer program product of claim 30, wherein the relative altitude of the first reading is a first barometer reading, wherein the relative altitude of the second reading is a second barometer reading, wherein a time difference between the first barometer reading and the second barometer reading is below a threshold.

42. The computer program product of claim 41, wherein barometer readings sampled in between the first barometer reading and the second barometer reading exclude device-induced atmospheric pressure change.

43. The computer program product of claim 29,
   wherein said determining is performed by a classifier, wherein the classifier is configured to determine the change in the altitude of the mobile device based on one or more accelerometer reading of the set of accelerometer readings, wherein the classifier is trained based on a training set comprising pairs of accelerometer readings and labels thereof obtained using one or more devices, wherein each label of an accelerometer reading in the training set is an altitude change computed based on barometer readings, wherein the barometer reading and the accelerometer reading are obtained by a same device of said one or more devices.

44. The computer program product of claim 29, wherein the plurality of mobile devices are heterogeneous mobile devices having different sets of sensors.

45. The computer program product of claim 29, wherein the three-dimensional map is a dynamic map, wherein the dynamic map represents dynamic population distribution in different altitudes of a single location in the dynamic map.

46. The computer program product of claim 45, wherein the single location is a building, wherein the dynamic map shows a population of each floor of the building.

* * * * *